United States Patent
Maki et al.

(10) Patent No.: US 8,023,158 B2
(45) Date of Patent: Sep. 20, 2011

(54) IMAGE PROCESSING SYSTEM AND IMAGE PROCESSING METHOD

(75) Inventors: Yoichiro Maki, Nagano-ken (JP); Hideyuki Narusawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 317 days.

(21) Appl. No.: 12/136,122

(22) Filed: Jun. 10, 2008

(65) Prior Publication Data

US 2008/0247001 A1 Oct. 9, 2008

Related U.S. Application Data

(60) Division of application No. 11/237,871, filed on Sep. 29, 2005, now Pat. No. 7,471,423, which is a continuation-in-part of application No. 10/948,467, filed on Sep. 24, 2004, now abandoned.

(30) Foreign Application Priority Data

| Sep. 26, 2003 | (JP) | 2003-336136 |
| Mar. 3, 2004 | (JP) | 2004-059460 |
| May 31, 2004 | (JP) | 2004-160474 |
| Sep. 21, 2004 | (JP) | 2004-273329 |
| Sep. 12, 2005 | (JP) | 2005-263585 |
| Sep. 16, 2005 | (JP) | 2005-269647 |

(51) Int. Cl.
*H04N 1/40* (2006.01)

(52) U.S. Cl. .................................. 358/3.26; 358/448

(58) Field of Classification Search ................. 358/1.9, 358/2.1, 448, 461, 3.26; 382/173–174, 273–275
See application file for complete search history.

(56) References Cited

U.S. PATENT DOCUMENTS

| 5,061,995 A | 10/1991 | Lia et al. |
| 5,444,779 A | 8/1995 | Daniele |
| 6,438,271 B1 | 8/2002 | Usami et al. |
| 2005/0219632 A1 | 10/2005 | Maki et al. |
| 2006/0268359 A1 | 11/2006 | Maki et al. |

FOREIGN PATENT DOCUMENTS

| JP | 54-83438 A | 7/1979 |
| JP | 2-67081 A | 3/1990 |
| JP | 9-9041 A | 1/1997 |
| JP | 11-041394 A | 2/1999 |
| JP | 11-261933 | 9/1999 |
| JP | 2001-298605 A | 10/2001 |
| JP | 2001-301265 A | 10/2001 |
| JP | 2002-292938 A | 10/2002 |
| JP | 2003-001873 A | 1/2003 |
| JP | 2003-266855 A | 9/2003 |
| JP | 2004-096500 | 3/2004 |
| JP | 2004-187111 A | 7/2004 |
| JP | 2004-199489 A | 7/2004 |
| JP | 2004-358714 A | 12/2004 |
| JP | 3781192 B2 | 3/2006 |
| JP | 2004-358714 A | 12/2008 |

*Primary Examiner* — Thomas D Lee
*Assistant Examiner* — Stephen M Brinich
(74) *Attorney, Agent, or Firm* — Sughrue Mion, PLLC

(57) ABSTRACT

An image processing system comprising: an image acquisition unit for acquiring a scanned image; a non-voltage storage medium that stores correction information corresponding to a known object having a three-dimensional shape defined by the standard; when an object of the scanned image is the known object, a correction unit that corrects a shadow area of the scanned image corresponding to a shadow resulting from thickness of the known object, on the basis of the correction information.

9 Claims, 25 Drawing Sheets

FIRST SCANNED IMAGE

SECOND SCANNING AREA

SECOND SCANNED IMAGE

DISTORTION CORRECTION

CLIPPING

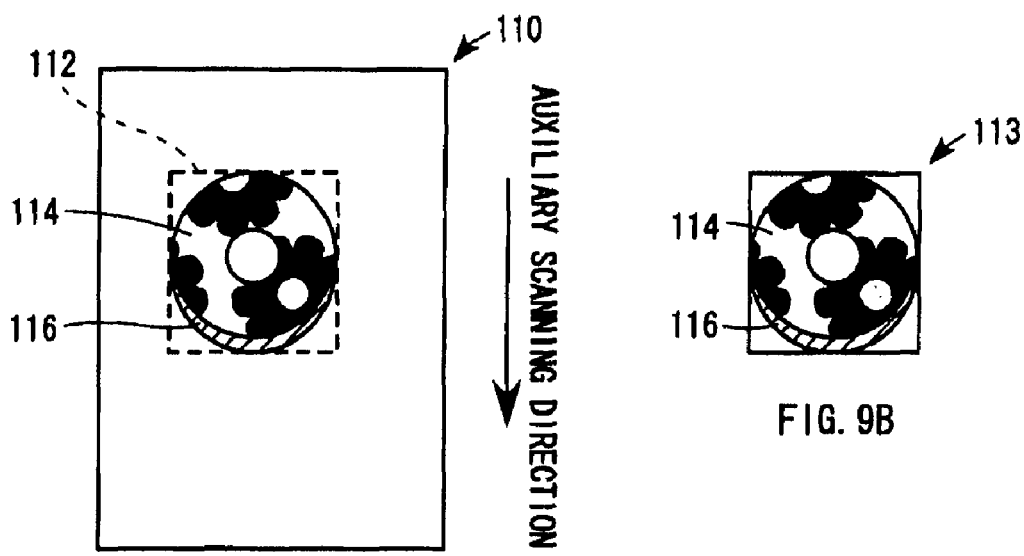
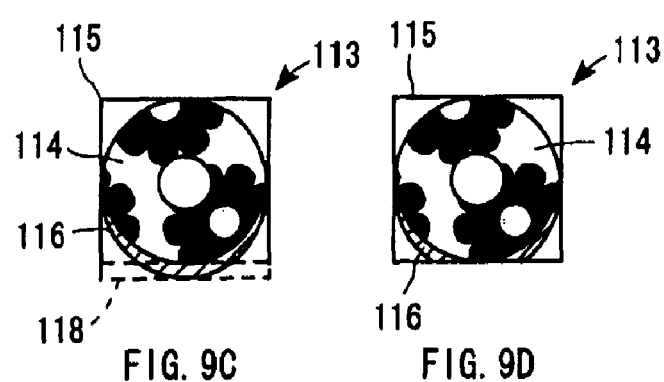
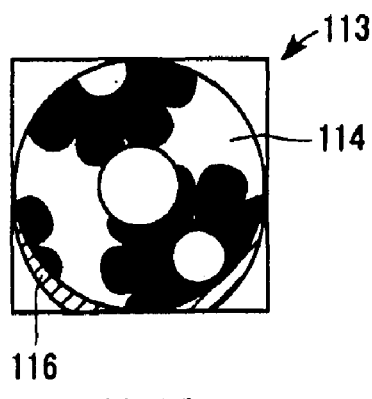

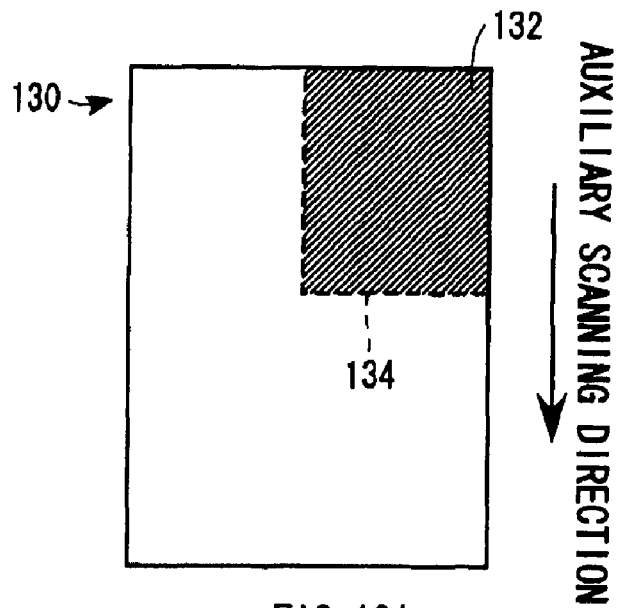
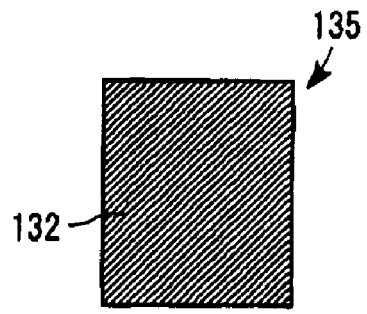
FIG. 10A  FIG. 10B
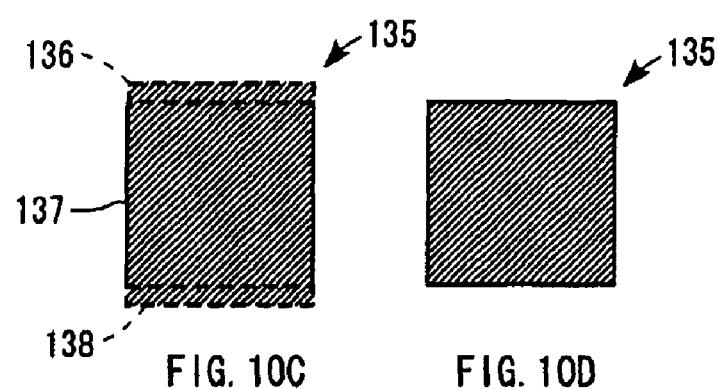
FIG. 10C  FIG. 10D
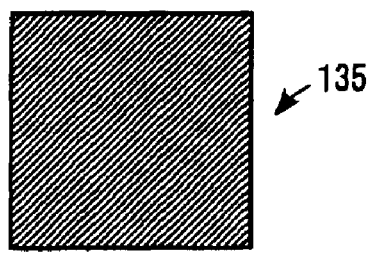
FIG. 10E

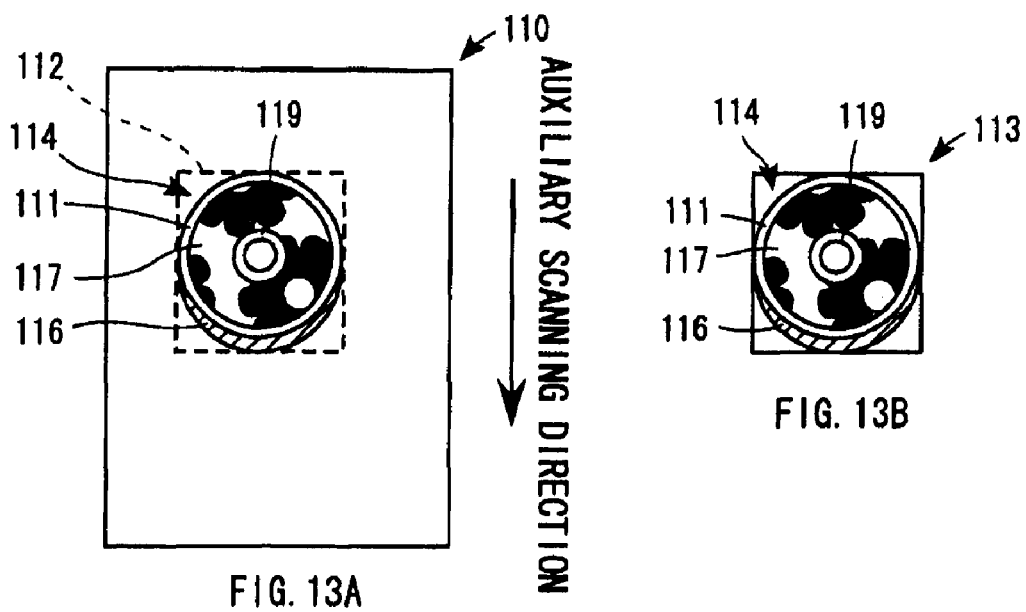
FIG. 13A
FIG. 13B
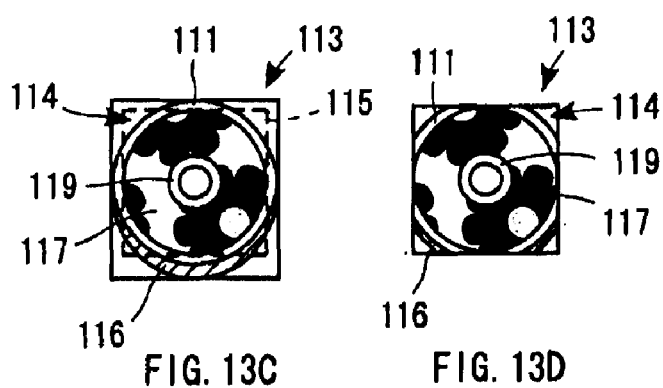
FIG. 13C
FIG. 13D
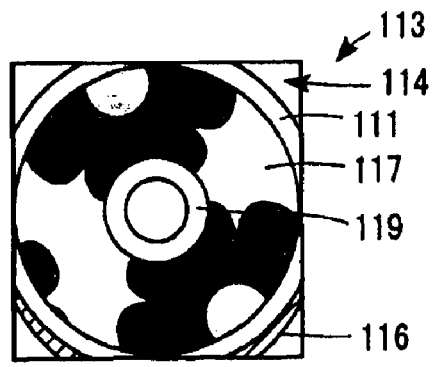
FIG. 13E

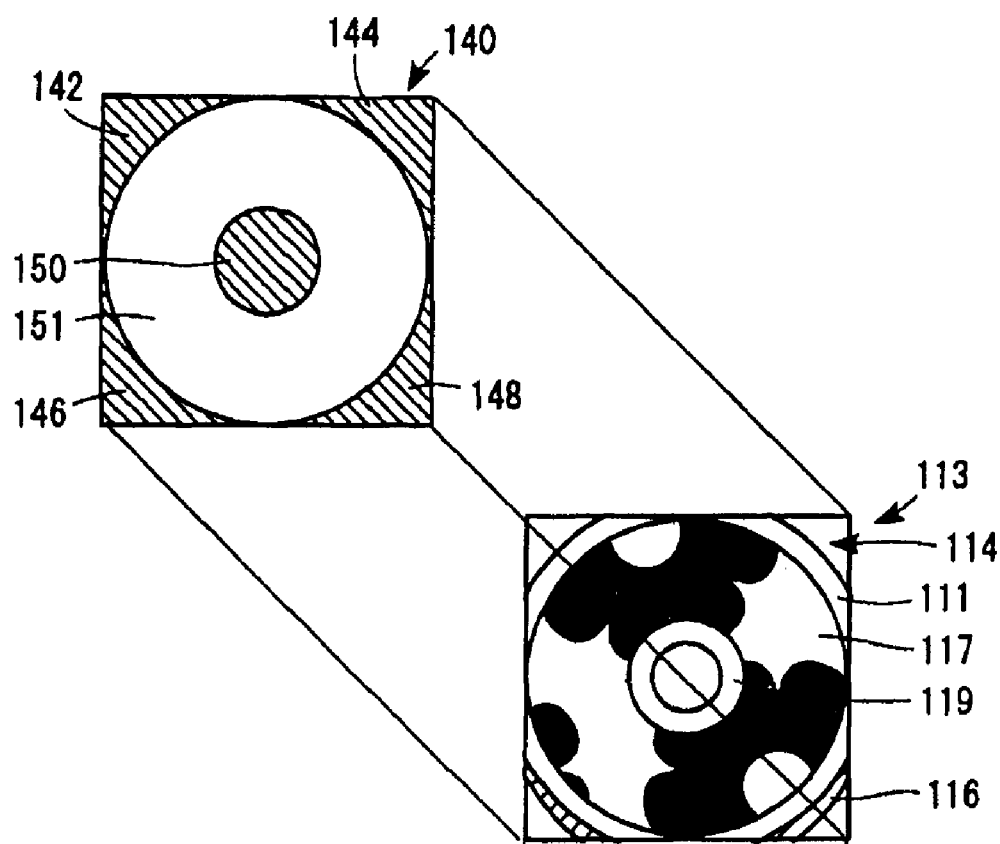
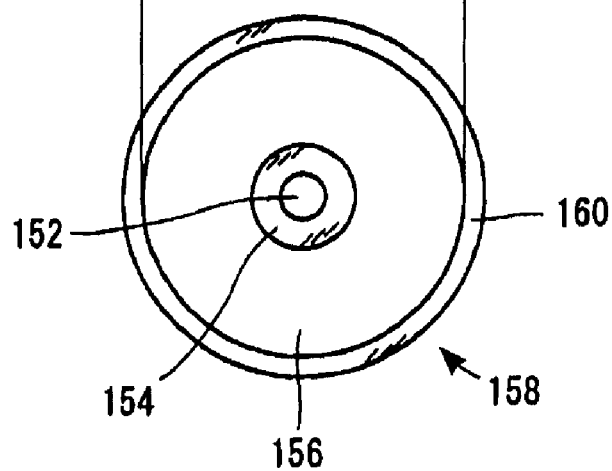
FIG. 14

FIG.16
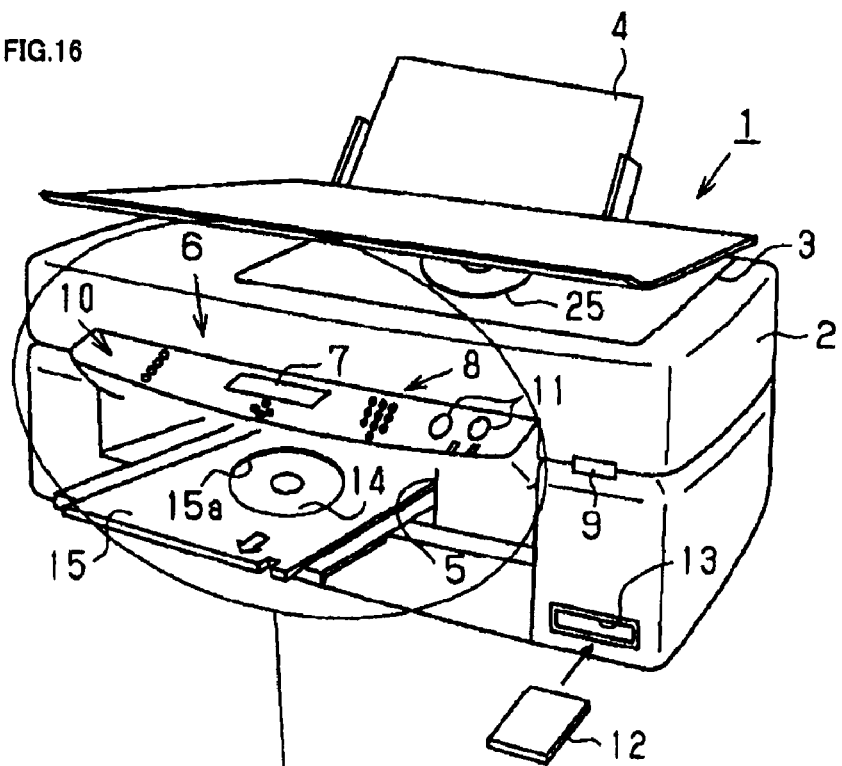
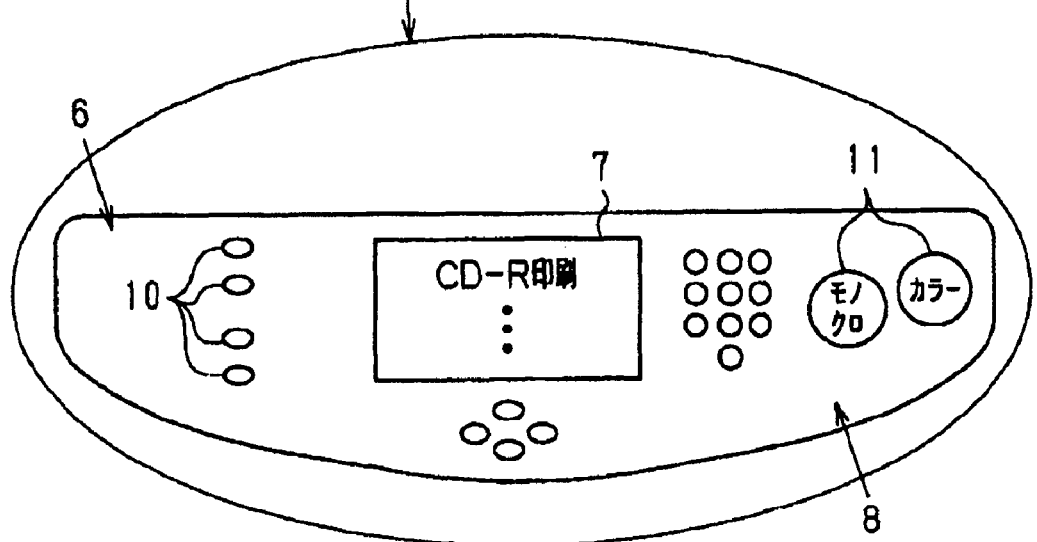

FIG.19
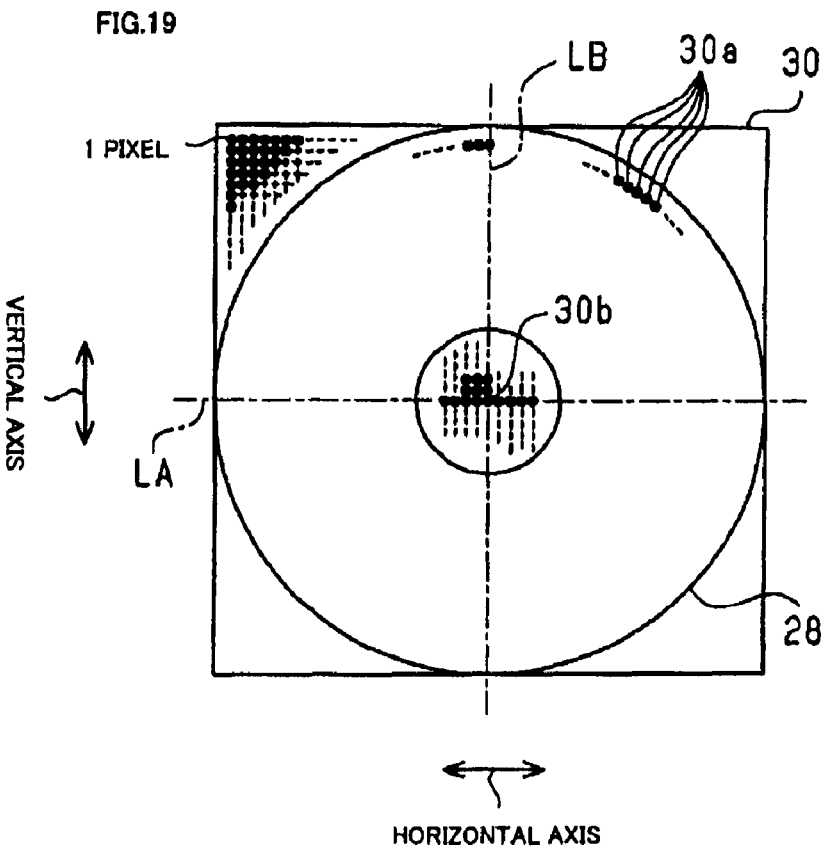
FIG.20a
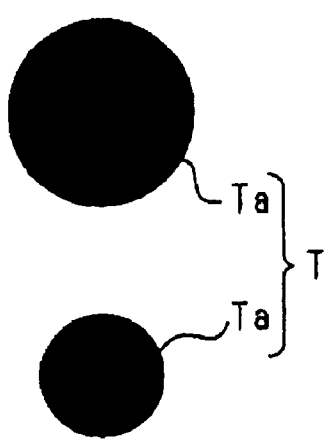
FIG.20b
| TEMPLATE T | Ta | Tb |
|---|---|---|
| MASK INFORMATION | Ka | Kb |
TABLE TB1 FOR SCAN PRINTING FIG.23
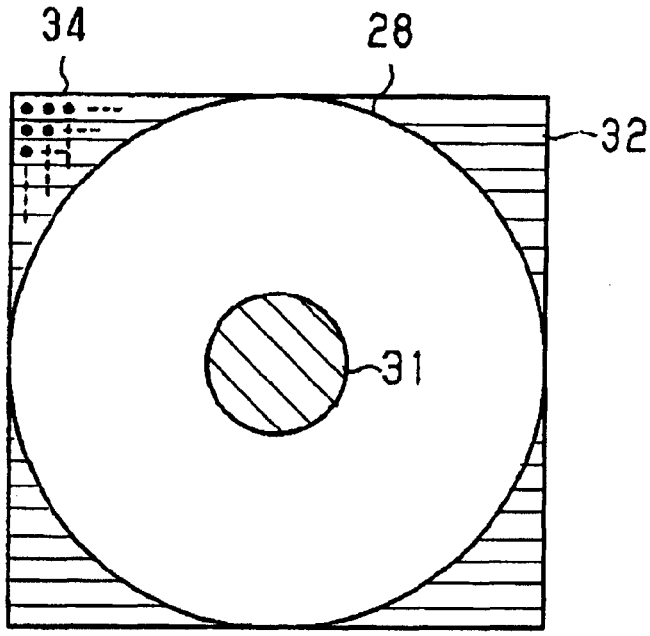
FIG.24
| CD-R SIZE | Sa (12cm) | Sb (8cm) |
|---|---|---|
| MASK INFORMATION | Kc | Kd |
TABLE TB2 FOR CARD PRINTING
FIG.25
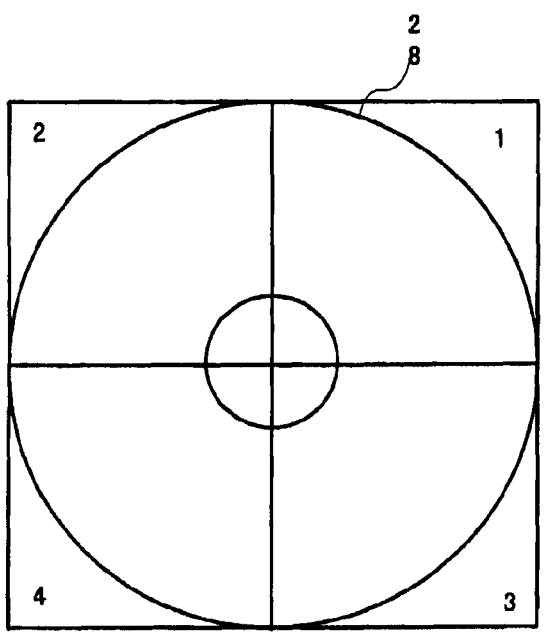

TRANSMIT TO THE PRINTER

IMAGE PROCESSING SYSTEM AND IMAGE PROCESSING METHOD

CROSS-REFERENCES TO RELATED APPLICATIONS

This application is a divisional of U.S. patent application Ser. No. 11/237,871, filed Sep. 29, 2005, which is a continuation-in-part application of U.S. patent application Ser. No. 10/948,467, filed on Sep. 24, 2004. Priority is claimed from Japanese Patent Application No. 2003-336136, filed on Sep. 26, 2003, Japanese Patent Application No. 2004-059460 filed on Mar. 3, 2004, Japanese Patent Application No. 2004-160474, filed on May 31, 2004, Japanese Patent Application No. 2004-273329, filed on Sep. 21, 2004, Japanese Patent Application No. 2005-269647, filed on Sep. 16, 2005, and Japanese Patent Application No. 2005-263585, filed on Sep. 12, 2005. The disclosures, including the specifications, drawings and abstracts of all of the foregoing U.S. and foreign applications are incorporated herein by reference in their entirety.

BACKGROUND OF THE INVENTION

1. Field of the Invention

The present invention relates to an image processing system and an image processing method, and more specifically, correcting of scan images of an object having a shape of which is defined by the specification, in particular.

2. Description of Related Art

So-called flat bed type copier having an image reading function and a printing function that can copy a label of standardized disk type storage media such as a Compact Disk (CD), DVD and the like are known. (for example JP-A-2004-199489, JP-A-2003-1873). However, in such copiers in related art, there has been the problem that a shadow of a disc placed on a document bed and illuminated from below the document bed is cast onto the document backing mat, and this shadow is printed on the label as the print medium.

Also, in general, in scanners, since the sampling pitch at the time of reading slightly differs in the main scanning direction and the auxiliary scanning direction due to production tolerance, secular variations, temperature changes and the like, scanned images are distorted approximately 1 to 2%. Correction of distortion of scanned images prior to reading to compensate for secular variations, temperature changes and the like is difficult to implement, because it decelerates reading rate or it requires mounting on a scanner and the like of a standard object that is less susceptible to secular variations or temperature changes Consequently, copiers of related art had a problem that an unwanted blank area is formed on a label obtained by hard-copying or ink has run off into areas outside of the label area.

SUMMARY OF THE INVENTION

The present invention is made in light of the problems mentioned above, and aims to provide an image processing system and an image processing method that can automatically correct images of an object having a shape of which is defined by the standard.

(1) An image processing system for achieving the above object comprises an image acquisition unit for acquiring a scanned image, a non-volatile storage medium in which correction information corresponding to a known object having a three-dimensional shape defined by the standard is stored, and a correction unit that corrects a shadow area of the scanned image corresponding to a shadow resulting from thickness of the known object on the basis of the correction information, if an object of the scanned image is a the known object.

If an object to be scanned has a significant thickness, when the object is read while being illuminated by a flat bed type image scanner, a shadow of the object is read as an image. If thickness and a planar shape of an object to be scanned and direction of illumination at the time of reading have been predetermined, a shadow area of an object to be scanned present on a scanned image can be corrected. Thus, advance storage in the image processing system of correction information corresponding to a known object having a three-dimensional shape of which is defined by the standard enables correcting of the shadow area on the scanned image.

The image acquisition unit may acquire the scanned image read from an object placed on a transparent document bed and covered by a document backing mat and illuminated from a direction making a specified angle with a perpendicular line to the plate face of the document bed. The correction information may correspond to the specified angle.

If the thickness of the object to be scanned and the illumination direction at the time of reading have been predetermined, advance storage in the image processing system of the correction information corresponding to the illumination direction enables correcting of the shadow area of the object to be scanned present on the scanned image.

(3) The known object may be a disk type storage medium. On the basis of the correction information, the correction unit may correct the shadow area, by replacing pixels of the scanned images other than the area corresponding to the label of the disk type storage medium, by white.

If an object is a disk type storage medium having a configuration of which is strictly defined by the standard, replacement of pixels in any area other than the area corresponding to the label of the disk type storage medium by white enables correcting of the scanned images to an image only label of which can be hard copied.

(4) An image processing method for achieving the above object comprises acquiring a scanned image, acquiring correction information corresponding to a known object having a three-dimensional shape defined by the standard from a non-volatile storage medium in which the correction information is stored, and correcting a shadow area of the scanned image corresponding to a shadow resulting from thickness of the known object, on the basis of the correction information, when the object of the scanned image is the known object.

(5) An image processing system for achieving the above object comprises an image acquisition unit for acquiring a scanned image, a non-volatile storage medium in which correction information corresponding to a known object having a planar shape defined by the standard is stored, and a correction unit that corrects distortion of the scanned image on the basis of the correction information when the object of the scanned image is the known object.

If the planar shape of the object to be scanned has been predetermined, the distortion of the scanned image can be corrected so that the object to be scanned can be represented in the scanned image without being distorted. Therefore, advance storage of correction information corresponding to a known object having a planar shape defined by the standard enables correcting of distortion of a scanned image on the basis of the correction information.

(6) The known object may be a disk type storage medium. The correcting means may correct distortion of the image by deforming the scanned image so that a rectangle circumscribing an area to be divided through area division can have an aspect ratio to be determined by the correction information.

Area division of an image enables an area containing a disk type storage medium and its shadow to be divided from the entire image. A contour of the disk type storage medium defined by the standard is a circle of extremely high precision. A shadow of the disk type storage medium is displayed as a thin crescent shaped image. Maximum width of the shadow can be accurately specified according to the thickness of the disk type storage medium defined by the standard. Thus, an aspect ratio of a rectangle circumscribing an area containing the disk type storage medium and its shadow can be used as a reference value of extremely high precision. Thus, if a scanned image is deformed so that a rectangle circumscribing an area to be divided through area division will have a predetermined aspect ratio, distortion of the scanned image can be corrected with high precision.

For example, the image processing system can set a second scan area that is an appropriate rectangle corresponding to an area in which a disk type storage medium to be identified through area division of a pre-scanned image of low resolution and its shadow thereof are showing. Deformation of a scanned image read from the second scan area that has been thus set, into an aspect ratio to be determined by the correction information enables correcting of distortion of the scanned image with high precision.

(7) The method according to the present invention comprises acquiring a scanned image, acquiring correction information according to a known object having a planar shape defined by the standard from a non-volatile storage medium in which the correction information is stored, and correcting distortion of the scanned image on the basis of the correction information when an object of the scanned image is the known object.

(8) The image processing system for achieving the object comprises an image acquisition unit for acquiring a scanned image, a non-volatile storage medium in which correction information corresponding to a known object having thickness and a planar shape defined by the standard is stored, and a correction unit that corrects distortion of the scanned image on the basis of the correction information and corrects a shadow area of the scanned image resulting from the thickness of the known object on the basis of the correction information.

If an object to be scanned has a significant thickness, and when the object is read and illuminated by a flat bed type image scanner, a shadow of the object is read as an image. If the thickness, a planner shape of an object to be scanned and a direction of illumination at the time of reading have been predetermined, the shadow area of the object to be scanned present on the scanned image can be corrected. In addition, if the planar shape of the object to be scanned has been predetermined, distortion of the scanned image can be corrected so that the object to be scanned can be represented in the scanned image without being distorted. Therefore, advance storage in the image processing system of correction information corresponding to a known object having a three-dimensional shape defined by the standard could correct distortion of the scanned image on the basis of the correction information and correct a shadow area on the scanned image.

(9) The correction unit may correct the shadow area after the distortion of the scanned image was corrected.

Correction of distortion of a scanned image prior to (correcting of) a shadow area enables the shadow area to be accurately corrected without being subject to production tolerance, secular variations, temperature changes and the like.

(10) The image processing method for achieving the object comprises acquiring a scanned image, acquiring correction information corresponding to a known object having a thickness and a planar shape defined by the standard from a non-volatile storage medium in which the correction information is stored, and correcting a shadow area of the scanned image corresponding to a shadow resulting from the thickness of the known object on the basis of the correction information after correcting distortion of the scanned image on the basis of the correction information when the object of the scanned image is the known object.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention. In the drawings:

FIGS. 9A through 9E are schematic views of an embodiment of the present invention.

FIGS. 10A through 10E are schematic views of an embodiment of the present invention.

FIGS. 13A through 13E are schematic views of an embodiment of the present invention.

FIG. 14 is a schematic view of an embodiment of the present invention.

FIG. 16 is a perspective view of a printer in one embodiment.

FIG. 19 is an illustration showing pixel data to be acquired by actual scanning.

FIG. 20 (*a*) is a conceptual scheme of a template and FIG. 20 (*b*) is a table scheme for scan printing.

FIG. 23 is an illustration showing pixel data to be acquired when data is developed.

FIG. 24 is a table view for card printing.

FIG. 25 is an illustration showing when a plurality of images is printed in one CD-R.

FIG. 29 is a block diagram showing configuration of a control system that the image scanner of FIG. 28 is equipped with.

DETAILED DESCRIPTION OF THE PREFERRED EMBODIMENTS

Figure 1A:
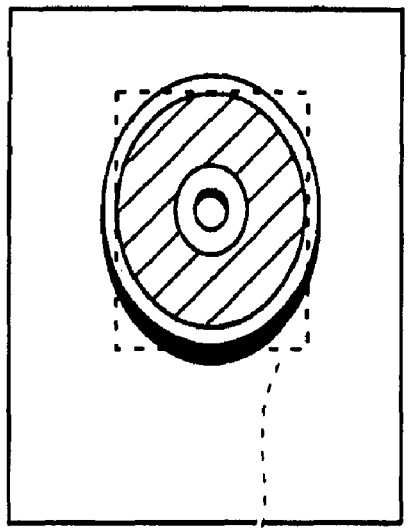
FIGS. 1A through 1D are schematic views of an embodiment of the present invention.

The invention will now be taught using various exemplary embodiments. Constituent parts having been assigned the same reference numerals in different preferred embodiments are equivalent. Although the embodiments are described in detail, it will be appreciated that the invention is not limited to just these embodiments, but has a scope that is significantly broader. The appended claims should be consulted to determine the true scope of the invention.

First Embodiment

Figure 2:
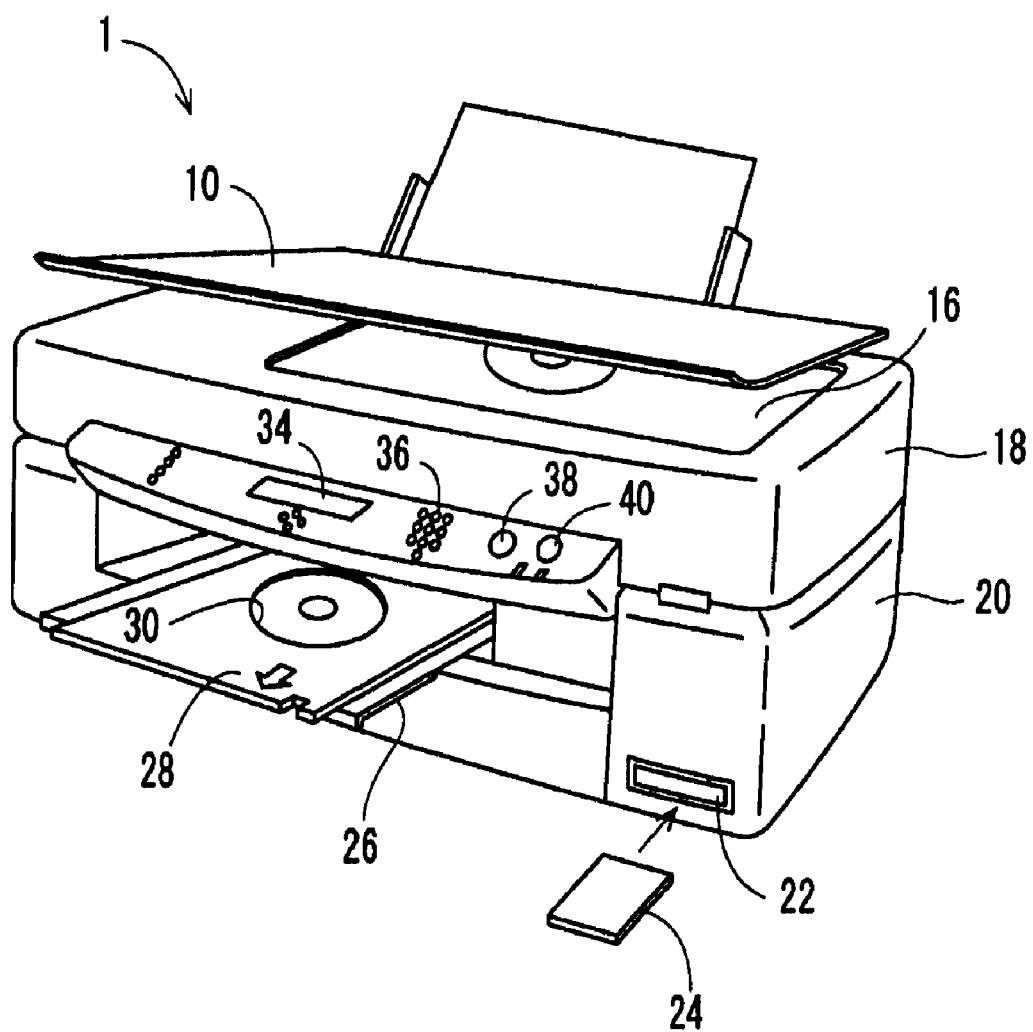
FIG. 2 is a perspective view of an embodiment of the present invention.
Figure 3:
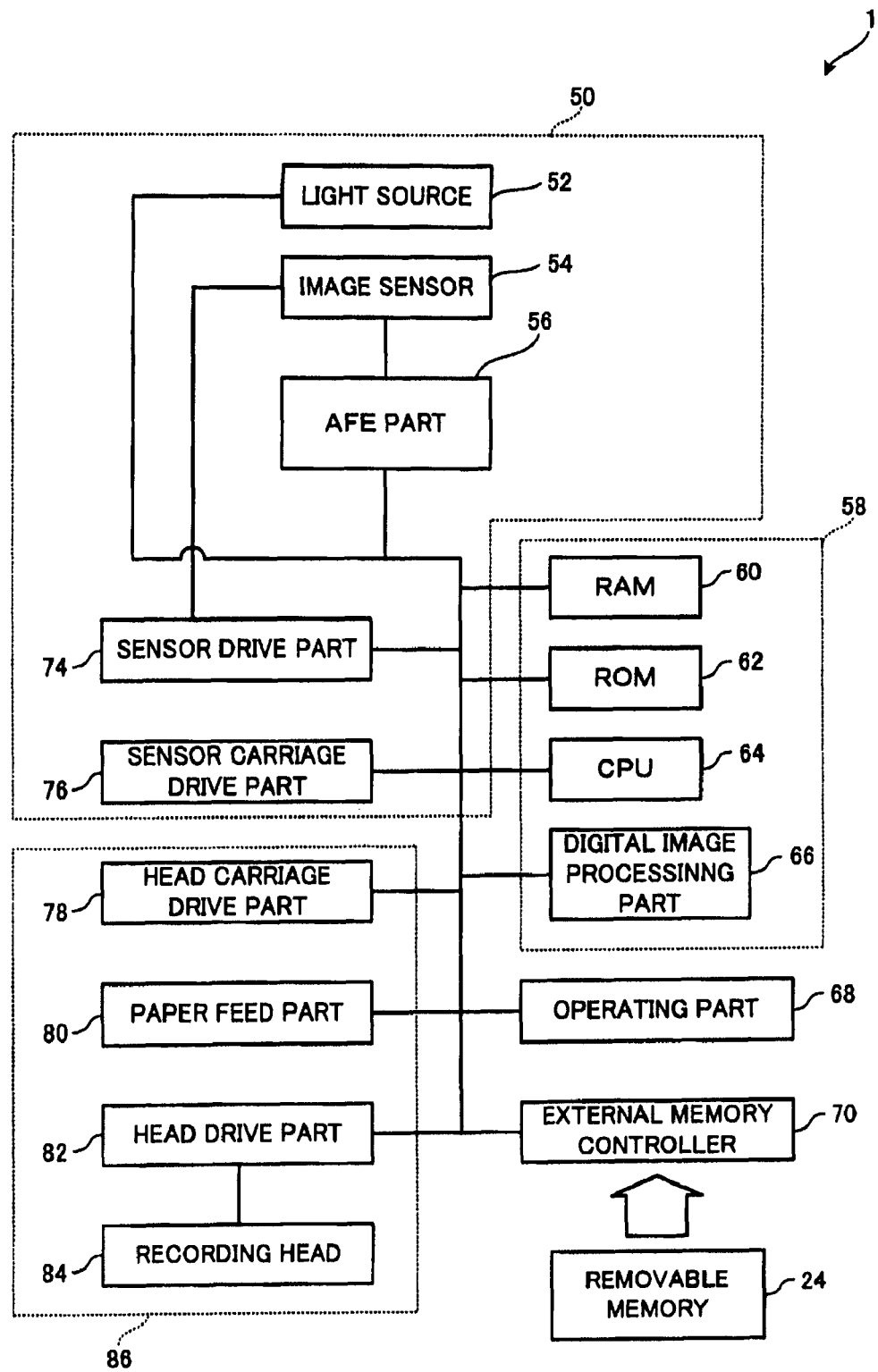
FIG. 3 is a block diagram of an embodiment of the present invention.
Figure 4:
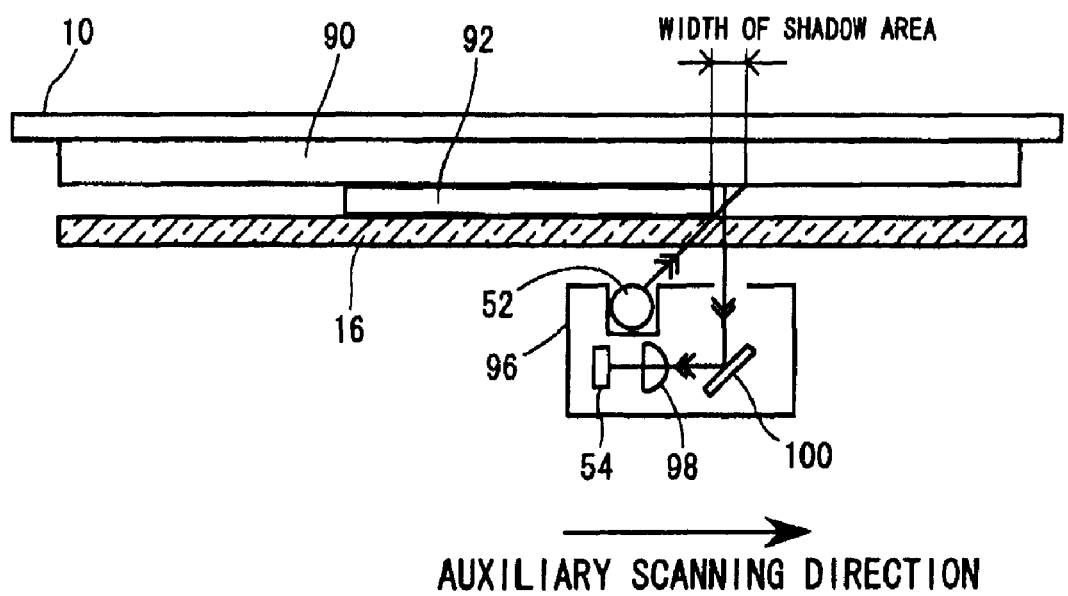
FIG. 4 is a schematic view of an embodiment of the present invention.

FIG. 2 is a perspective view showing the exterior of a copier 1 constituting a preferred embodiment of an image processing system according to the invention. FIG. 3 is a block diagram of the copier 1. FIG. 4 is a schematic view showing the construction of a scanning unit 50 of the copier 1. The copier 1 has a function of outputting image data obtained by reading an original document to a personal computer (PC) (not shown), a function of printing image data inputted from a removable memory 24 or from a PC, and a function of printing image data obtained by reading an original document.

The scanning unit 50 is housed in an upper case 18, and has a light source 52, an image sensor 54, an AFE (Analog Front End) part 56, a sensor drive part 74, and a sensor carriage drive part 76. The light source 52 consists of a fluorescent lamp or the like that is long in a main scanning direction. The image sensor 54, which is driven by the sensor drive part 74, is a linear image sensor such as a color CCD linear image sensor having an RGB 3-channel light-receiving device. The image sensor 54 is mounted on a sensor carriage 96 that moves parallel to a transparent document bed 16. The image sensor 54 outputs an electrical signal correlating with the light and shade of an optical image of an object 92 formed on a light-receiving surface by a lens 98 and a mirror 100. The sensor carriage drive part 76 has a motor, a drive belt and a driving circuit and so on (not shown). The sensor carriage drive part 76 moves the sensor carriage 96 back and forth along a guide rod (not shown) mounted perpendicular to a scanning line. The image sensor 54 can read a two-dimensional image by moving in a direction perpendicular to the scanning line. The AFE part 56 has an analog signal processing part for amplification, noise removal and so on, and an A/D-converter. The scanning unit 50 may be of the lens reduction type construction described above or alternatively of a contact type construction.

A print unit 86 is housed in a lower case 20 and has a recording head 84, a head drive part 82, a head carriage drive part 78, a paper feed part 80 and the like for forming an image on a print medium by the ink jet method. The print unit 86 may alternatively be of a construction corresponding to some other printing method, such as the laser method. The recording head 84 is mounted on a head carriage (not shown) fitted with an ink cartridge, and has a nozzle, a piezoelectric device, an ink passage and so on. The head carriage drive part 78 has a motor, a drive belt, a drive circuit (not shown) and so on. The head carriage drive part 78 moves the recording head 84 back and forth perpendicular to a longitudinal feed direction of the print medium. The paper feed part 80 has paper feed rollers, a motor, a drive circuit (not shown) and so on. By rotating the paper feed rollers, the paper feed part 80 carries copy paper or a CD tray 28 (see FIG. 2) in a direction perpendicular to the movement of the recording head 84. The print unit 86 is so constructed that it can carry the CD tray 28 and form an image on a label face of a CD positioned in a positioning part 30 of the CD tray 28.

An external memory controller 70 is connected to a removable memory 24 inserted into a card slot 22 (see FIG. 2). Data held on the removable memory 24 is read out by the external memory controller 70 and passed on to a RAM 60.

An operating part 68 has an LCD 34 for displaying menus and various push-buttons 36, 38 and 40 as scrolling keys, a selecting key and a cancel key and so on for operating the menus.

A control part 58 has the RAM 60, a ROM 62, a CPU 64 and a digital image processing part 66. By executing control programs stored in the RAM 60, the CPU 64 functions as the image acquisition unit, the correction unit, an image pre-acquisition unit, and a setting unit, thus controlling various parts of the copier 1. The ROM 62 as a non-volatile storage medium is a non-volatile memory for storing control programs. The RAM 60 is a volatile memory in which various data such as control programs and scanned images are held temporarily. Control programs may also be obtained from a remote server and stored in the ROM 62 via a network or may be stored in the ROM 62 via a computer-readable recording medium such as the removable memory 24. The digital image processing part 66 is a dedicated circuit such as a DSP circuit or the like that executes image processing of the scanned image such as gamma correction, resolution conversion, color balance correction, half-toning, and conversion of color spaces in cooperation with the CPU 64.

The foregoing is description of the hardware construction of the copier 1. Next, shadows appearing in scanned images are discussed.

As shown in FIG. 4, the light source 52 is provided in a position off a light path leading from the plate face of the document bed 16 to the image sensor 54. In addition, the light source 52 illuminates the object 92 from a direction at a specified angle with a line perpendicular to the plate face of the document bed 16. Thus, when the object 92 is thick, a shadow of the object 92 illuminated by the light source 52 is formed on the document backing mat 90 fixed to the document cover 10, and this shadow appears itself in the scanned image.

Figure 5:
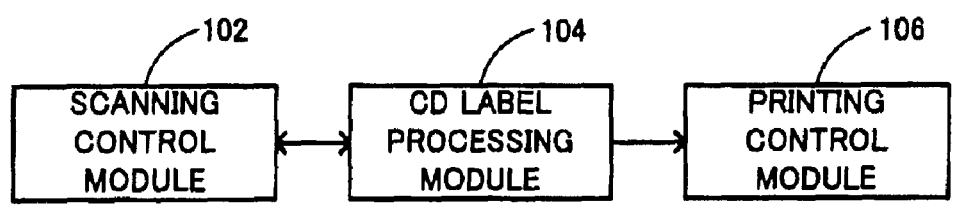
FIG. 5 is a block diagram of an embodiment of the present invention.

FIG. 5 is a block diagram of a control program of the copier 1.

In response to a read start request, a scanning control module 102 controls the scanning unit 50 and stores a scanned image in the RAM 60. A CD label processing module 104 specifies a second scan area by area division of a low-resolution scanned image (pre-scanned images) acquired by a first reading. For the area division, a threshold value (e.g., 200/255) at a level obtained by subtracting a predetermined margin from the shade level of the pixels corresponding to the document backing mat 90 is used.

As a result of the area division, an area in which a CD and its shadow appear is divided from an entire prescanned image. The CD label processing module 104 recognizes that the object is a CD by a characteristic analysis of the prescanned image. In the characteristic analysis, for example it analyzes whether or not a dimension of the second scan area is a dimensions that has a tolerance level compliant to a CD standard dimension.

The CD label processing module 104 resizes a high-resolution scanned image (the second scanned image) acquired by a second reading, with different scaling factors in the longitudinal and cross directions. Then, the CD label processing module 104 resizes the second scanned image with different scaling factors in the longitudinal and cross directions on the basis of the correction information, and deforms the second scanned image into a rectangle of a dimension compliant to the standard dimension of a CD. The correction information stored in the ROM 62 contains the number of pixels in the longitudinal and cross directions of the rectangle after the deformation, and is set in accordance with a CD diameter standard (12 cm) and width of a CD shadow. The width of a CD shadow is determined by an incident angle of a light emitted from the light source 52 onto the document bed 16 and the CD thickness standard. To be specific, for example, in the model in which the width of the CD shadow in the longitudinal direction is 1 mm when the second reading is executed at the resolution of 720 dpi, the numbers of pixels in the cross direction and in the longitudinal direction of a rectangle circumscribing the area that contains the CD and its shadow after deformation are 3402 and 3430, respectively.

The CD label processing module 104 removes the end area of the second scanned image on the basis of the correction information. The correction information includes information indicating how much width of a CD shadow appears, being tangent to any side of the second scanned image. The width of a shadow is set on the basis of the number of pixels or its proportion to length of one side of the second scanned image.

Figure 6A:
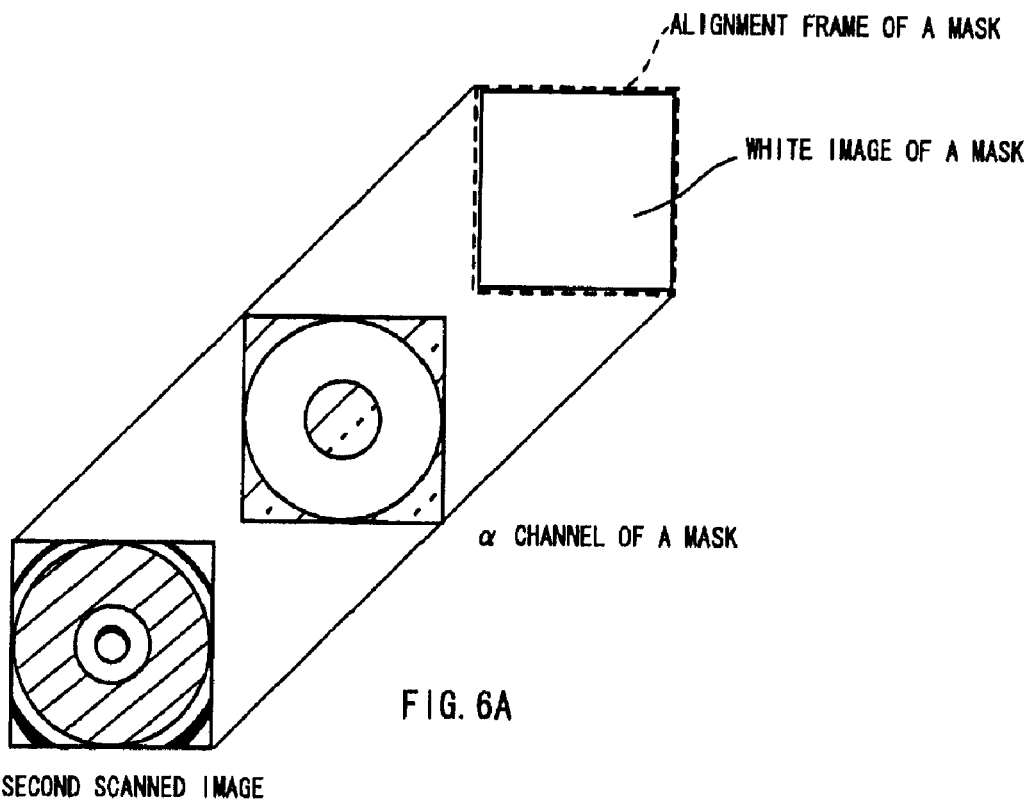
FIGS. 6A and 6B are schematic views of an embodiment of the present invention.
Figure 6B:
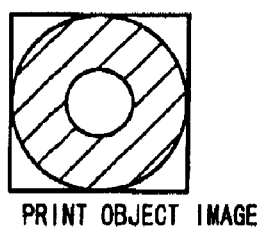

The CD label processing module 104 creates a print object image by replacing a pixel value of the second scanned image by white in the range specified by the correction information. To be specific, for example, the CPU 64 replaces by white a pixel value of any area outside the area in which a label appears, while counting pixels in the order of rasters on the basis of the correction information. It may alternatively create a print object image on the basis of a mask and the second scanned image as shown in FIG. 6. The mask can be stored as the correction information in the ROM 60, and is comprised of: a square white image, an a channel that is two-dimensional array information showing that a pixel value of the second scanned image takes precedence in an area corresponding to a CD label, while a pixel value of the white image takes precedence in an area outside the area corresponding to the CD label; and frame information for aligning the white image, the a channel and the second scanned image.

A printing control module 106 creates a print data by carrying out processings to convert the color spaces of a print object image that is a corrected scanned image to a color space of ink such as CMYK, converting resolution, half toning, interlacing and so on, and controls the print unit 86 on the basis of the print data.

Figure 7:
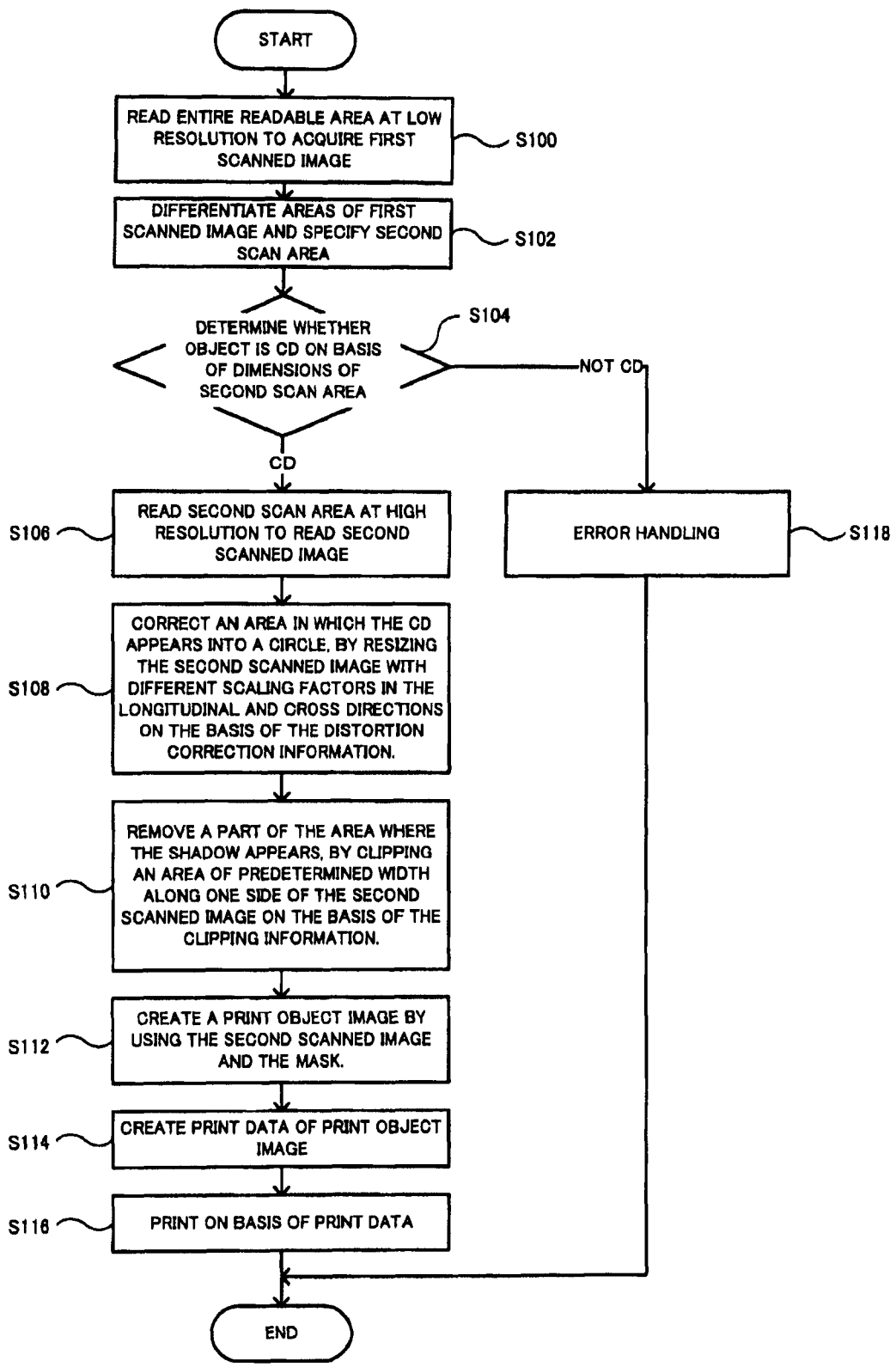
FIG. 7 is a flow chart of an embodiment of the present invention.

FIG. 7 is a flow chart showing a processing flow used by a copier 1 in which the control part 58 executes the control program described above. The processing shown in FIG. 7 is started when the copier 1 change to a CD copy mode by a predetermined menu operation.

In step S100, the control part 58 makes the scanning unit 50 read the whole readable area of the document bed 16 at a low resolution and stores a prescanned image in the RAM 60. FIG. 1A shows the prescanned image taken in the condition with a CD placed on the document bed 16. In the prescanned image, a CD and its shadow appear. The shadow of the CD appears in a crescent shape in areas outside the outer circumference of and inside the inner circumference of the CD, respectively. In addition, in FIG. 1 and FIG. 6, areas corresponding to the shadows are blackened out and the area corresponding to the label is hatched.

In Step 102, the control part 58 identifies an area in which a CD and its shadow appear by a result of area division of the prescanned image. When the object is a CD, the shade level of the area in which the CD and its shadow appear is considerably lower than that of the area in which the document backing mat 90 appears. Thus, when a threshold of area division is set on the basis of the shade level of the area in which the document backing mat 90 appears, as shown in FIG. 1 (A), the area in which the CD and its shadow appear can be divided from the whole prescanned image. Furthermore, the control part 58 sets the rectangular second scanned area on the basis of that area. Although the second scanned area may be a rectangular area circumscribing the area in which the CD and its shadow appear, for example, an area that excludes a 3-mm wide area from the outer circumference of the rectangular area circumscribing the area in which the CD and its shadow appear is set as the second scanned area. Consequently, the area in which a transparent part present in the outer circumference of the CD appears can be excluded from the three sides of the second scanned area. In addition, the transparent part present in the outer circumference of the CD may be replaced with white pixels through the processing, to be discussed later, for replacing any area other than the label area of the second scanned image with white pixels. In addition, the second scanned area in which a maximum width of the CD shadow is removed from one side of the rectangle circumscribing the area in which the CD and its shadow appear may alternatively be set. In addition, as a method for setting the second scanned area, edge detection may be used other than area division that uses a threshold of the shade level.

In Step S104, the control part 58 determines on the basis of the dimension of the second scanned area whether the object is a CD or something other than a CD. Specifically, for example the control part 58 determines whether the object is a CD or something other than CD, by checking if the dimension of the second scanned area corresponds to 11.7 cm (±3%)×11.8 (±3%). When it determines that the object is a CD, the control part 58 proceeds to Step S106, while it proceeds to Step S118 and executes error processing when it determines that the object is not a CD.

Figure 1B:
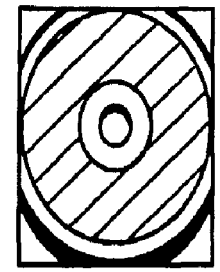

In Step S106, the control part 58 makes the scanning unit 50 to read the second scanned image set in Step S102 at a high resolution and stores the second scanned image in the RAM 60. FIG. 1B shows the second scanned image taken in the condition with the CD placed in the document bed 16. The CD label and a part of the CD shadow appear in the second scanned image.

Figure 1C:
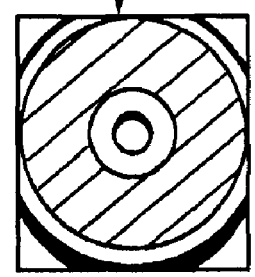

In Step S108, the control part 58 resizes the second scanned image on the basis of the correction information and deforms the second scanned image into a predetermined rectangle (see FIG. 1C). Tolerance to be acceptable to the standard dimension of a CD is extremely small and the illumination direction of the light source 52 is substantially free from any change due to secular variations or temperature changes. Thus, resizing of the second scanned image 113 with different factors in the longitudinal and cross directions, on the basis of correction information that has been set before shipment according to the standard dimension of the CD and the illumination direction of the light source 52 enables the area in which a CD label appears to be corrected to an accurate circular form. In addition, since there is no need to read a standard object at the time of reading and create distortion correction information, a scanned image free from distortion can be acquired in a short period of time. In addition, as distortion of the scanned image is corrected before correcting of a shadow area, the shadow area can be accurately corrected without being affected by production tolerance, secular variations, temperature changes and the like, and pixels in any area other than the area in which the label appears can be accurately replaced by white.

Figure 1D:
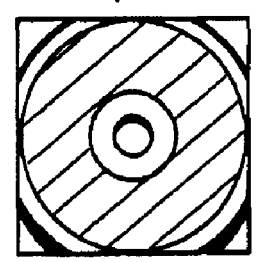

In Step S110, the control part 58 clips an area of predetermined width along one side of the second scanned image on the basis of correction information. As a result, a part of the area in which a shadow of the second scanned image appears and a part of the area in which the transparent part in the outer circumference of the CD are removed, and the second scanned image is deformed as shown in FIG. 1D.

In Step S112, the control part 58 replaces a pixel value of any area outside the area in which the label of the second scanned image appears with white, and creates a print object image.

In Step S114, the control part 58 creates a print data by carrying out processing such as color space conversion, resolution conversion, half toning, interlacing on the print object image and so on.

In Step S116, the control part 58 controls the print unit 86 on the basis of the print data to print an image on a CDR label in the CD tray 28. As a result, the label of the CD placed on the document bed 16 is hard copied to the CDR label. The control part 58 may also create a print data so that the label image can be printed in a slightly wider area than an empty print object label, and thus control the print unit 86. As a printing medium on which the CD label on the document bed 16 is copied, a plain seal and the like having a peel-and-stick area corresponding to the CDR label can be used.

Second Embodiment

Figure 8:
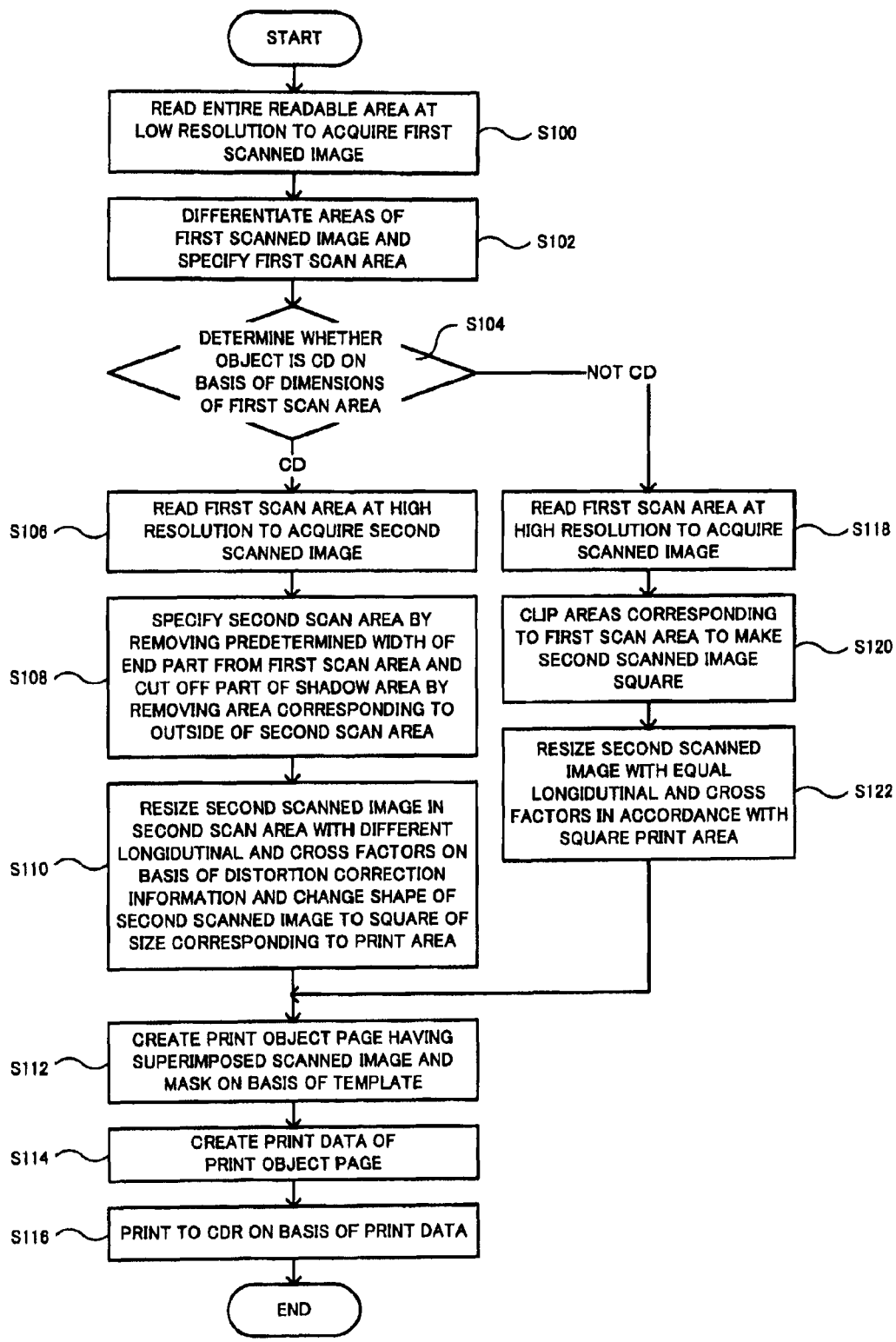
FIG. 8 is a flow chart of an embodiment of the present invention.

FIG. 8 is a flow chart showing a second preferred embodiment of the process flow of the copier 1.

In step S100, the control part 58 makes the scanning unit 50 read the whole readable area of the document bed 16 at a low resolution when a CD copy start request is received as a result of a predetermined menu operation, and a first scanned image is stored in the RAM 60. FIG. 9A shows a first scanned image 110 taken in the condition with a CD placed on the document bed 16. In the first scanned image 110, a CD 114 and a CD's shadow 116 appear. FIG. 10A shows a first scanned image 130 taken in the condition with a thin object such as a piece of paper placed on the document bed 16. In the first scanned image 130, a thin object 132 appears but no shadow of the thin object 132 appears.

In step S102, the control part 58, executing the CD label processing module 104, specifies the area of the object 114, 132 by area division of the first scanned image, and also specifies a first scan area 112, 134 equivalent to the rectangle circumscribing the area of the object 114, 132. When the object is a CD, because the shade level of the area corresponding to the CD's shadow 116 is considerably lower than the shade level of the area corresponding to the document backing mat 90, the areas corresponding to the CD 114 and the CD's shadow 116 are both included in the first scan area 112, as shown in FIG. 1A. Although in FIG. 9 and FIG. 10 a first scan area 112, 134 and a second scan area 115, 137 are shown superimposed on the first scanned image 110, 130 and the second scanned image 113, 135, in reality the first scan area 112, 134 and the second scan area 115, 137 are areas on the document bed 16. Next, the control part 58 sets the first scan area 112, 134 as a second reading area. As the method for specifying the objects 114, 132, besides area division using a shade level threshold value, edge detection may alternatively be used.

In step S104, the control part 58 determines on the basis of the dimensions of the first scan area 112, 134 whether the object is a CD or something other than a CD. Specifically, for example the control part 58 determines whether the object is a CD or something other than a CD on the basis of whether or not the dimensions of the first scan area 112, 134 are 12 cm (±3%)×12 cm (±3%). When it determines that the object is a CD, the control part 58 proceeds to step S106, and when it determines that the object is not a CD it proceeds to step S118. As the characteristic of the CD used for specifying that the object is a CD, besides external dimensions, it is also possible to use for example whether there is a circular hole in the middle. When the object is specified by a characteristic analysis, it becomes unnecessary for the user to specify what the object is in an interactive mode, and it is possible to cut down the procedures of operating the copier 1.

In step S106 and step S118, executing the scanning control module 102, the control part 58 makes the scanning unit 50 read the read area set in step S102 at a high resolution and stores it as a second scanned image in the RAM 60. FIG. 9B shows a second scanned image 113 taken in the condition with a CD placed on the document bed 16. In the second scanned image 113, the CD 114 and the CD's shadow 116 appear. FIG. 10B shows a second scanned image 135 taken in the condition with a thin object such as a piece of paper placed on the document bed 16. In the second scanned image 135, the thin object 132 appears but no shadow of the thin object 132 appears.

In step S108 executed when the object is a CD, the control part 58, executing the CD label processing module 104, specifies a second scan area 115 obtained by removing a predetermined width of one end of the first scan area 112 on the basis of the above-mentioned clipping information (see FIG. 1C), and cuts off an area of the second scanned image 113 corresponding to the outside areas 118 of the second scan area 115. As a result, a part of the area corresponding to the CD's shadow 116 is removed from the second scanned image 113, and the second scanned image 113 is changed in shape as shown in FIG. 1D. The clipping information is set in accordance with the auxiliary scanning direction, an angle formed by a light path leading from the light source 52 to the plate face of the document bed 16 and a light path leading from the plate face of the document bed 16 to the image sensor 54, and a CD diameter specified as a standard dimension and thickness thereof and stored in advance in the ROM 62. The clipping information specifies which the shadow appears in the scanned image in forward or backward direction of the auxiliary scanning direction relative to the CD with a maximum width of what percent to the diameter of the CD on the scanned image. The clip information is set in terms of a proportion when CD reading resolution is arbitrary, while it can be set in terms of the number of pixels when the CD reading resolution is known.

In step S110 executed when the object is a CD, the control part 58 resizes the second scanned image 113 in the second scan area 115 on the basis of the distortion correction information and deforms the second scanned image 113 to a square of a size corresponding to the size of the print area and the printing resolution (see FIG. 9E). The distortion correction information is information set in correspondence with the ratio of the sampling spacing in the main scanning direction to the sampling spacing in the auxiliary scanning direction at the time of reading, and stored in the ROM 62 in advance. The distortion correction information is set on the basis that a pixel spacing at the time of display is the same in the main scanning direction and the auxiliary scanning direction. Consequently, by resizing the second scanned image in accordance with the ratio of the sampling spacing in the main scanning direction to the sampling spacing in the auxiliary scanning direction at the time of reading, it is possible to make the longitudinal/cross ratio of the actual object and the longitudinal/cross ratio of the displayed object the same. Since the second scanned image 113 being resized by different factors in the longitudinal and cross directions on the basis of distortion correction information preset in accordance with the characteristics of the scanning unit 50, the longitudinal/cross ratio of the original CD label image and the longitudinal/cross ratio of the CD label image printed with the copier 1 can be made exactly the same. And, a thin crescent-shaped blank area is prevented from forming on the CD label area 156 that is the print medium.

In step S120 executed when the object is not a CD, the control part 58 specifies a square area inscribing the first scan area 134 with its center of gravity at the center of the first scan area 134 (see FIG. 10C) as a second scanned area 137. The control part 58 also removes end parts 136, 138 corresponding to areas obtained by removing the second scan area 137 from the first scan area 134, and thereby changes the shape of the second scanned image 135 to square (see FIG. 10D).

In step S122 executed when the object is not a CD, the second scanned image 135 is resized by equal factors in the longitudinal and cross directions in accordance with the size of the print area.

In step S112, the control part 58 creates a print object page on the basis of the above-mentioned template and the second scanned image 113, 135. A template is comprised of a mask corresponding to a shape of a CD label and position information for superimposing the second scanned image and the mask on the page in a predetermined position. The mask is two-dimensional array information for setting non-print pixels as pixels that do not need to be printed.

Figure 11:
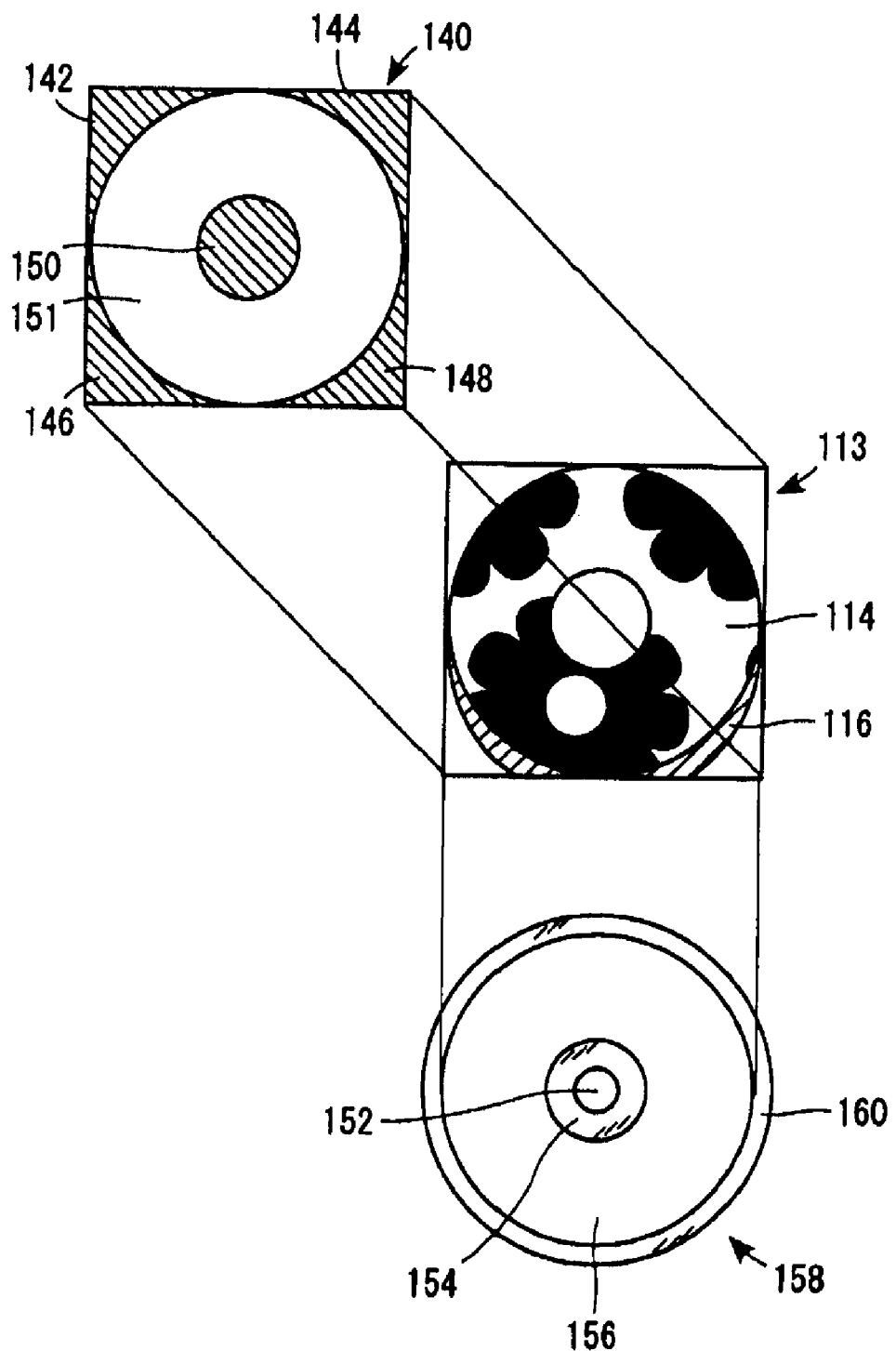
FIG. 11 is a schematic view of an embodiment of the present invention.

FIG. 11 is a schematic view illustrating the creation of a print object page using a template. A mask 140 constituting a template is set in accordance with the standard dimensions of a CD 158 and the printing resolution and pre-stored in the ROM 62. The mask 140 has corner areas 142, 146, 148, 144 and a circular central area 150 having values for setting pixels as not-to-be printed pixels, and an annular no-setting area 151 having values for not changing pixels. The diameter of the central area 150 is equal to the internal diameter of the CD label area 156 of the CD 158. The external diameter of the no-setting area 151 is equal to the external diameter of the CD label area 156 of the CD 158 and equal to the length of one side of the second scanned image 113, 135 on which the processing of up to step S110 or S122 has been carried out. When the mask 140 and the second scanned image 113 are superimposed on the print object page so that their respective centers of gravity coincide, a print object page is formed such that an image is formed only on the CD label area 156 of the CD 158. As a result, ink is prevented from adhering to an inner edge transparent part 154 of the CD 158, an outer edge transparent part 160 of the CD 158, a platen positioned directly below a central opening 152 in the CD 158, or the CD tray 28. The shape of the mask 140 does not have to be that described above, and for example it is possible to adopt a construction in which ink does not adhere to highly reflective areas positioned on the inner side and the outer side of the CD label area 156, a construction in which predetermined margins are set at the inner edge and the outer edge of the CD label area 156, and/or a construction in which the image is formed on the inner edge transparent part 154 and the outer edge transparent part 160 as well.

In step S114, the control part 58 creates a print data by carrying out color space conversion, binarization and interlacing on the print object page.

In step S116, the control part 58 controls the print unit 86 on the basis of the print data to print an image on the CD 158 in the CD tray 28. As a result, an image of the object placed on the document bed 16 is printed on the CD 158.

Third Embodiment

Figure 12:
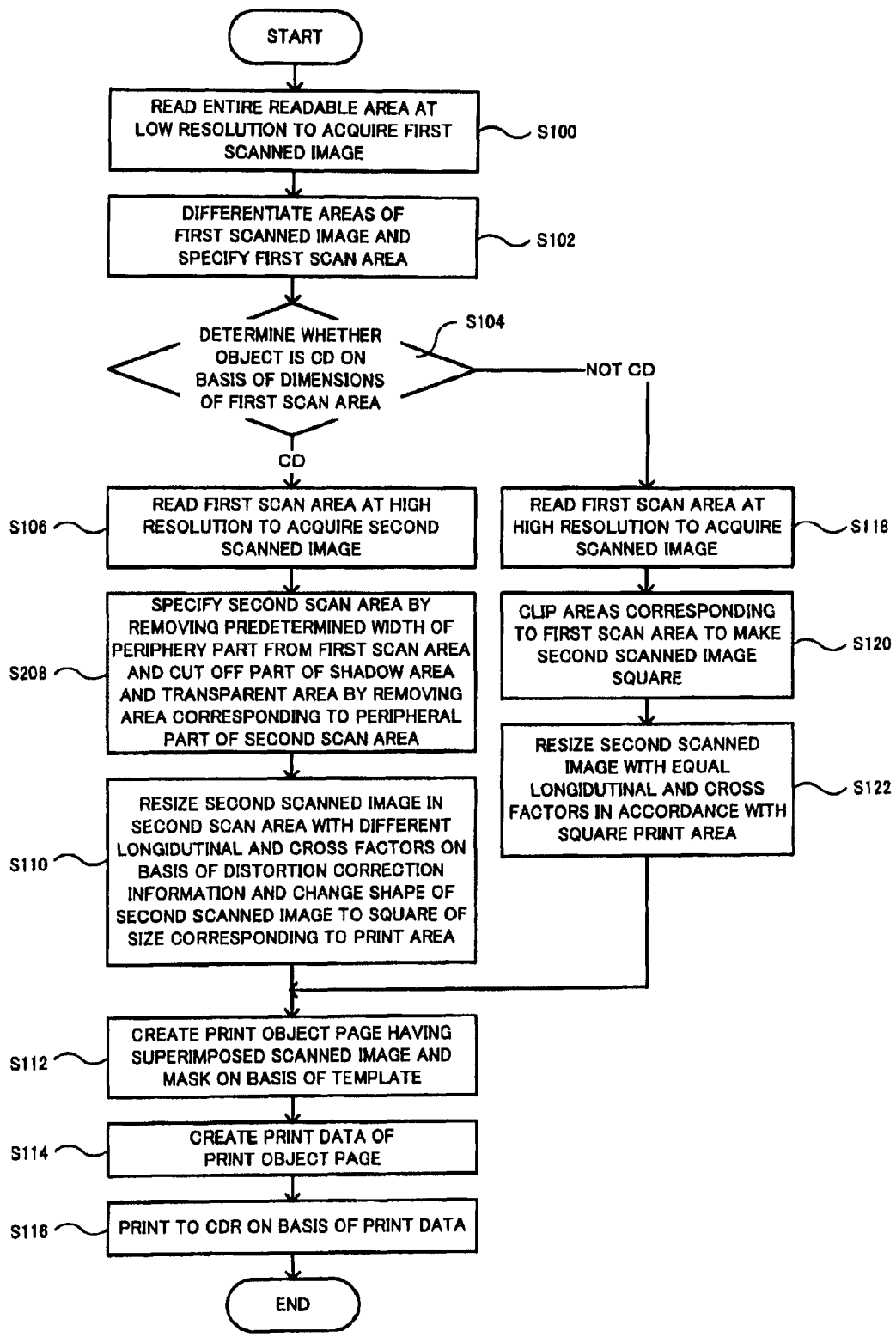
FIG. 12 is a flow chart of an embodiment of the present invention.

FIG. 12 is a flow chart showing a third preferred embodiment of the process flow of the copier 1. This third preferred embodiment differs from the second preferred embodiment only in the clip processing of the second scan area, and otherwise is essentially the same as the second preferred embodiment. Hereinafter, details are described.

When the object is a CD, in the area division of the first scanned image in step S102, depending on the threshold value, a first scan area 112 of the kind shown in FIG. 13A may be set. In the first scanned image 110 taken in the first reading, the CD 114 and the CD's shadow 116 appear. In the area of the CD 114, an area 111 corresponding to a transparent part at the outer edge of the CD and an area 119 corresponding to a transparent part at the inner edge of the CD are included. The CD's shadow 116 is formed outside the area 111 corresponding to the transparent part at the outer edge of the CD.

As a result, in the step S106 of carrying out a second reading, the second scanned image 113 shown in FIG. 13B is acquired.

In step S208, the control part 58 specifies a second scan area 115 obtained by removing a predetermined width from the boundary of the first scan area 112 on the basis of clipping information (see FIG. 13C), and cuts off an area of the second scanned image 113 corresponding to an area outside the second scan area 115. The width cut off is set in accordance with the width of the transparent part of the CD, the thickness of the CD and the diameter of the CD. As a result, a part of the CD's shadow 116 and a part of the transparent part 111 of the CD are cut of from the second scanned image 113, and the second scanned image 113 changes in shape as shown in FIG. 13D.

In step S110, the second scanned image 113 shown in FIG. 13D is resized and deformed to a square corresponding to the size of the print area and the printing resolution.

In step S112, a mask 140 and the second scanned image 113 are laid out on a print object page as shown in FIG. 14. The length of one side of the mask 140 corresponds to the external diameter of an annular opaque area 117 of the CD. The diameter of the circular central area 150 of the mask 140 corresponds to the internal diameter of the opaque area 117 of the CD. As a result, the transparent parts 111, 119 of the CD are prevented from being printed in a thin gray color or the like onto the CD label area 156.

Fourth Embodiment

Figure 15:
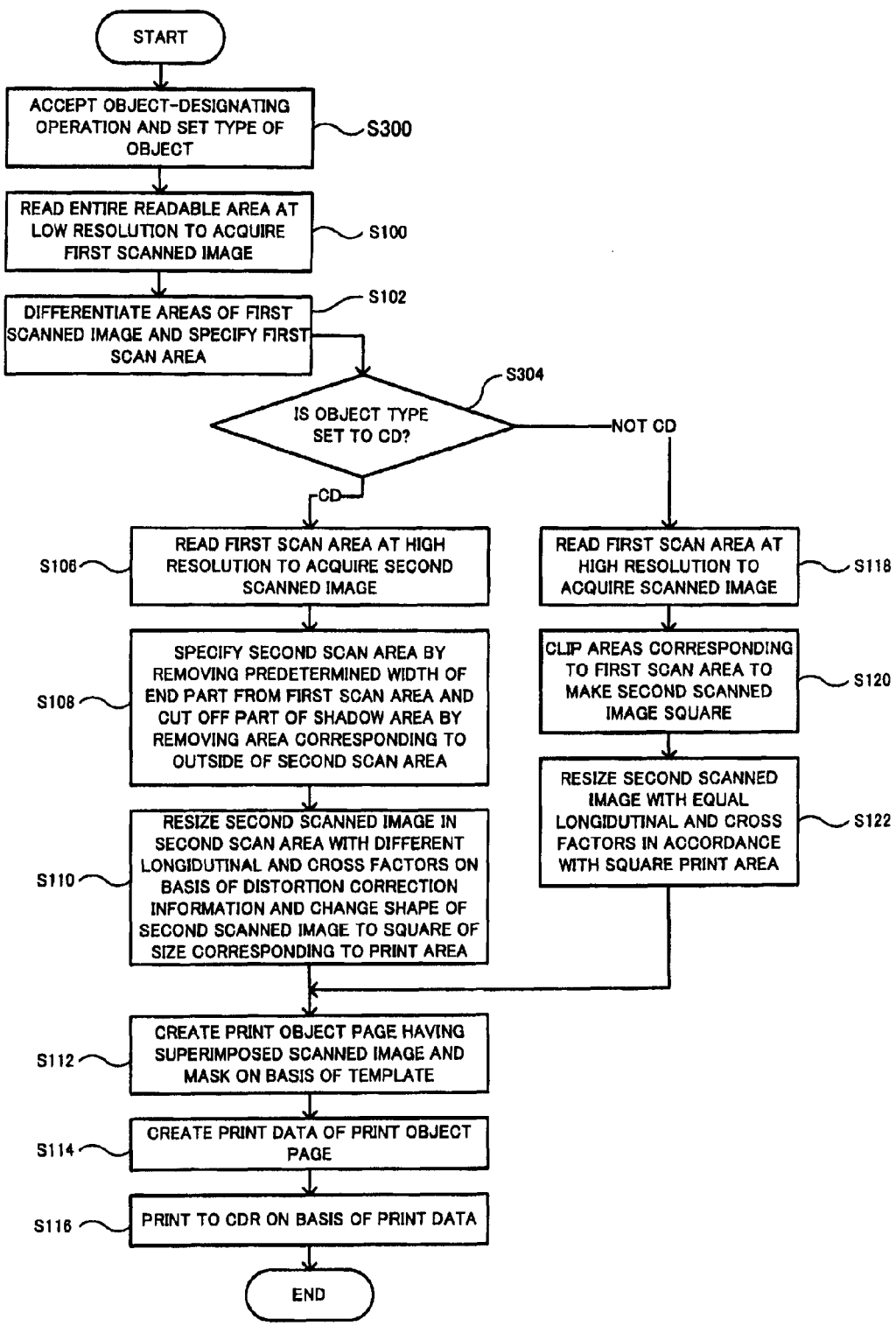
FIG. 15 is a flow chart of an embodiment of the present invention.

FIG. 15 is a flow chart showing a fourth preferred embodiment of the process flow of the copier 1. The fourth embodiment differs from the second preferred embodiment only in the method of identifying an object, and otherwise is essentially the same as the second preferred embodiment. Hereinafter, details are described.

In a step S300, the control part 58 accepts an object-designating operation as a predetermined menu operation and sets the type of the object in accordance with the object-designating user operation.

In step S304, the control part 58 determines whether the type of the object has been set to CD or has been set to something else, and if it has been set to CD then processing proceeds to step S106, and if it has been set to something other than CD then processing proceeds to step S118. That is, the control part 58 recognizes whether or not the object is a CD without performing a characteristic analysis of the first scanned image 110, 130 in the first scan area 112, 134. Consequently, in this fourth preferred embodiment, the time, and development/manufacturing costs spent on processing for characteristic analysis can be cut.

And although in the preferred embodiments described above the example of a CD was used as the object, the object can be any known object that can be identified by its shape or some other characteristic on the basis of a standard or the like, and may be a disk type storage medium such as DVD. Combinations and subcombinations of the various embodiments described above will occur to those familiar with this field, without departing from the scope and spirit of the invention.

Fifth Embodiment

In the following, with reference to FIG. 16 to FIG. 27, one embodiment of a printing method printing to a printing device or a medium in which the present invention has been embodied is described.

As shown in FIG. 16, a printer 1 as a printing device is a stand-alone machine of the ink jet method that can independently execute printing without being connected to a host computer. The printer 1 is capable of scan printing (copy printing) wherein it scans a copy (sample) placed on a document bed 3 that is a top face of a case 2, prints it, and ejects the sheet 4 from a sheet ejecting port 5. In addition, the printer 1 is also capable of scanner reading wherein it transmits a scanned image data (scanned data) to the host computer or printing and outputting a print data received from the host computer.

An operation panel part 6 is provided on the case 2 of the printer 1, and in the operation panel part 6 are provided an LCD (liquid crystal display) 7 or various switches 8 as an operating means. The LCD 7 displays menu functions, print conditions, content of operations, operating conditions, content of errors and the like. In addition, the various switches 8 include Power button 9 for turning on/off electricity to a power supply, Select button 10 for selecting a print mode of the printer 1, Print Start button 11 (2 types of color and monochrome buttons) to be pressed to start copying or scanning.

In the right lower part of the front of the case 2 is provided a card slot 13 into which a memory card 12 as a storage medium is inserted. The memory card 12 stores images taken by a digital camera, etc. as image data of digital signals. The printer 1 is capable of card printing wherein it reads the image data of the memory card 12 inserted into the card slot 13, and prints and outputs images selected through operation of the switches 8 onto a sheet 4. In addition, the card slot 13 comprises an import means (a reader).

The printer 1 is capable of CD-R printing wherein it prints on a CD-R 14 as a medium. Specifically, a CD-R 14 is placed in a hole part 15a of a flat-plate shaped CD-R tray 15, which is a component distinct from the printer 1. Then, the CD-R tray 15 is set in the printer 1. When a CD-R print mode is selected by pressing Select button 10 and printing is simultaneously started by pressing Print Start button 11, printing is executed with the upper side of the CD-R 14 surface as a print range.

Figure 17:
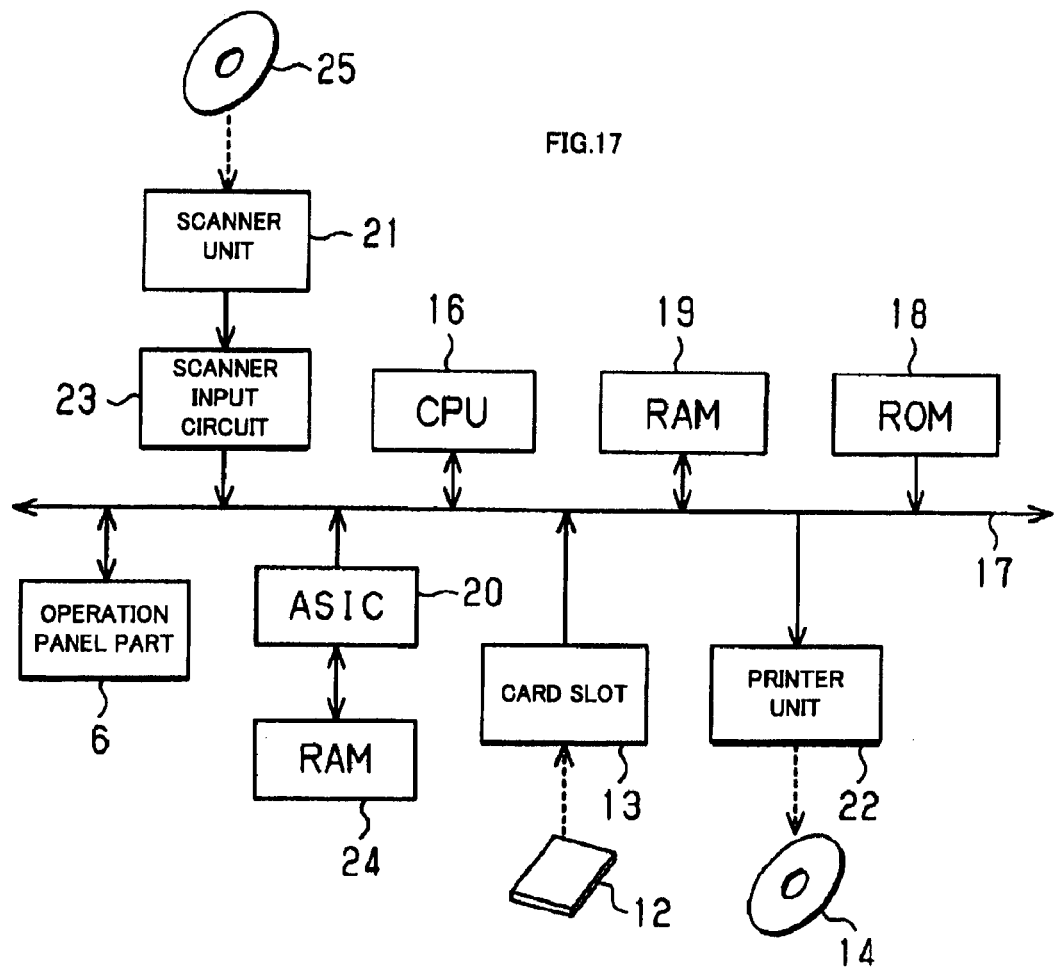
FIG. 17 is a block diagram showing an electric configuration of the printer.

As shown in FIG. 17, the printer 1 comprises a CPU 16 that is responsible for main control, and a ROM 18, a RAM 19 as a storage part, and ASIC 20 are connected to the CPU 16 via a bus 17. The printer 1 also comprises a scanner unit 21 and a printer unit 22. The scanner unit 21 consists of an exposure lamp, a CCD sensor, a pulse motor, and so on, and is connected to the bus 17 via a scanner input circuit 23.

In addition, the printer unit 22 consists of a head, a carriage motor, a paper feed motor, a drive circuit, and so on, and is connected to the bus 17. The scanner unit 21 and the scanner input circuit 23 comprise an import means (a scanner device), and the printer unit 22 corresponds to a print execution means.

The ROM 18 stores a control program for controlling the printer 1, a scanner control parameters for driving the scanner unit 21, a printer control parameters for driving the printer unit 22, and so on. The ROM 18 also stores a medium print execution program to be executed by the CPU 16 when CD-R printing is executed. In addition, the CPU 16 and the medium printing execution program comprise an image processing means and a recognition means, while the CPU 16, ASIC 20, and the medium print execution program comprise a control means.

A RAM 24 for ASIC is connected to the ASIC 20 that executes image processing on an image data scanned by the scanner or an image data read from the memory card 12, using the RAM 24 as a working area, and transmits the image data to the head of the printer unit 22. The CPU 16 controls the scanner unit 21 via the scanner input circuit 23 on the basis of the scanner control parameters in a scanning operation. At the time of printing, the CPU 16 controls the printer unit 22 on the basis of the image data after image processing and the printer control parameters, or controls data reading at the time of reading the image data from the memory card 12.

Then, the CD-R printing executed by scanning of a stand-alone device is described. First, a sample CD-R 25 is placed on the document bed 3 as a sample medium, and then the CD-R tray 15 on which an unprinted CD-R14 is placed is set in the printer 1. Next, the print mode is set to the CD-R print mode with Select button 10 and a printing method in that mode is set to scan printing. Then, in this state, when Print Start button 11 is pressed, the CPU 16 executes CD-R printing to be described below, on the basis of the medium print execution program in the ROM 18.

Figure 18:
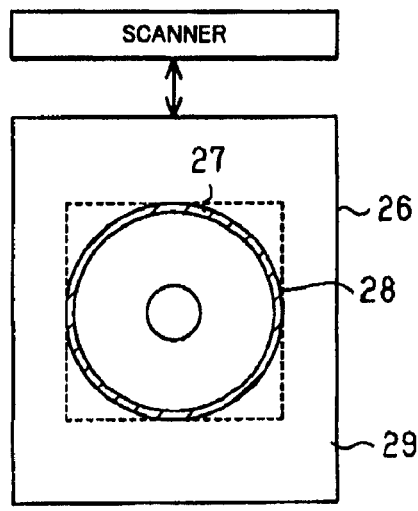
FIG. 18 is an illustration regarding image data to be acquired by prescanning.

First, the CPU 16 makes the scanner unit 12 to execute prescanning to obtain an image data 26 as shown in FIG. 18, and determines on the basis of the image data 26 in what position on the document bed 3 the sample CD-R 25 is placed. Now, when the sample CD-R 25 is scanned, a shadow part (a shaded area as shown in FIG. 18) 27 is scanned, and in the image data 26, it is determined that a CD-R image 28 also containing the shadow part 27 is the sample CD-R25. In addition, since the CD-R image 28 can be distinguished from any other part 29, looking at an outline of the CD-R image 28 enables the position of the sample CD-R 25 on the document bed 3 to be found.

Then, on the basis of scan result of the prescanning, the CPU 16 determines an actual scan area. In other words, it determines that the actual scan area is a minimum square area (the area shown by the dotted line in FIG. 18) in which the CD-R image 28 containing the shadow area 27 of the sample CD-R 25 is fit. Then, the CPU 16 makes the scanner unit 21 to execute the actual scan and reads at a high resolution the image data enclosed in the area shown by the dotted line in FIG. 18. Then, the CPU 16 transmits the image data read by the actual scanning, line by line, to the RAM 24 of the ASIC 20.

Now, the ASIC 20 sorts the image data of one line written in the RAM 24 in the order constituting one raster line at the time of head scanning, transfers it to the RAM 19 of the CPU 16, and repeatedly executes the transfer till all of lines of the image data are completed. Then, in the RAM 19, a pixel data (RGB data) 30 matched to the storage resolution (scanning resolution) as shown in FIG. 19 is created. The pixel data 30 will contain pixel 30a of the shadow part 27 of the sample CD-R25 that results from scanning.

When the transfer is completed, the CPU 16 executes image processing on the pixel data 30 written in the RAM 19. As elaborately described below, the ROM 18 stores a plurality of (two in this example) templates T, as shown in FIG. 20 (*a*), corresponding to the diameter size of the CD-R14. The templates T in this example are the template Ta whose diameter is 12 cm and the template Tb whose diameter is 8 cm.

The ROM 18 stores the table TB1 for scan printing as shown in FIG. 20 (*b*) in which mask information K is written in the templates Ta and Tb, respectively. The mask information K is to specify pixels not necessary for printing when CD-R 14 is printed, and to determine which pixels are to be white data for which no ink is discharged, with the center point (center pixel) 30b of a CD-R on the pixel data 30 shown in FIG. 19 as an origin. The mask information K in this example stores Ka, Kb corresponding to each temperate Ta, Tb, and specifies respective pixels of the shade part 27 of the pixel data 30, a center hole part 31 of the sample CD-R 25, and the outside part (4 corners) of the shadow part 27 shown in FIG. 21.

As image editing process, the CPU 16 first executes matching using the template T, compares the CD-R image (the image containing the shadow part 27) 28 in the pixel data 30 with the template T, and determines size of the sample CD-R25. Suppose in this example that it is determined that the CD-R size is 12 cm. Then, as shown in FIG. 19, the CPU 16 determines the number of pixels of the vertical and horizontal axis of the pixel data 30, and calculates, as a center point 30b of the CD-R image 28, an intersection of the line La on which intermediate pixels of the vertical axis are located and the line Lb on which intermediate pixels of the horizontal axis are located.

Figure 21:
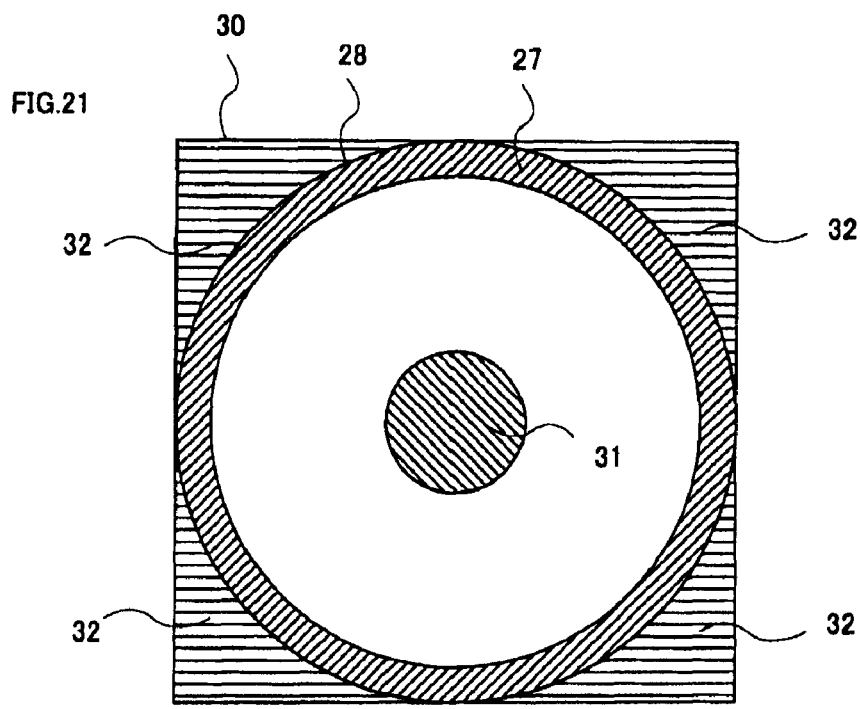
FIG. 21 is an illustration showing a part of pixel data that needs not to be printed.

After calculating the central point 30 b, the CPU 16 refers to the table TB1 and executes masking, and then sets any pixels not necessary for printing among respective pixels in the pixel data 30 as a white data (data for which no ink is discharged). More specifically, using the mask information Ka of the table TB1, the CPU 16 recognizes the shadow part 27, the center hole part 31, and the outside part 32, as shown in FIG. 21, which are not necessary for printing with the center point 30 b of the CD-R image 28 as an origin, and sets them as white data for which no ink is discharged. Then, the CPU 16 transmits to the ASIC 20 the pixel data 30 after the masking.

The ASIC 20 converts the pixel data 30 into resolution corresponding to the print resolution of the printer unit 22. Then, the ASIC 20 binarizes the pixel data and converts RGB system into pixel data of YMCK system (YMCK data). Then, the ASIC 20 executes microweaving of the YMCK data, and creates head drive data for one scan to be printed when the head makes one scan. The head drive data is binary data that instructs each nozzle of the head on whether there is any ink to be discharged, and how much of ink is to be discharged, and no ink is discharged for pixels being masked by masking.

Now microweaving is described. As the head of the printer unit 22 forms dots at a nozzle pitch in the feeding direction (auxiliary scanning direction) of the sheet 4, rasters of serial numbers cannot be formed in one main scan. Thus, while a plurality of rasters is formed at nozzle pitch spacing in every main scan, a position for forming a raster is offset a little by little whenever a raster is formed. Then, microweaving is such that finally a series of rasters is formed by gradually filling gaps between rasters with a raster.

After this, as soon as the head drive data for one scan has accumulated in the RAM 24, the ASIC 20 sequentially outputs it to the printer unit 22. The CPU 16 not only drives the head on the basis of the head drive data, but also executes printing on the CD-R 14 by driving the carriage motor or the paper feed motor and the like on the basis of the printer control parameters. This could enable printing of images on the CD-R 14 that do not have shadows, yet with no color adhered to unnecessary parts.

Figure 22:
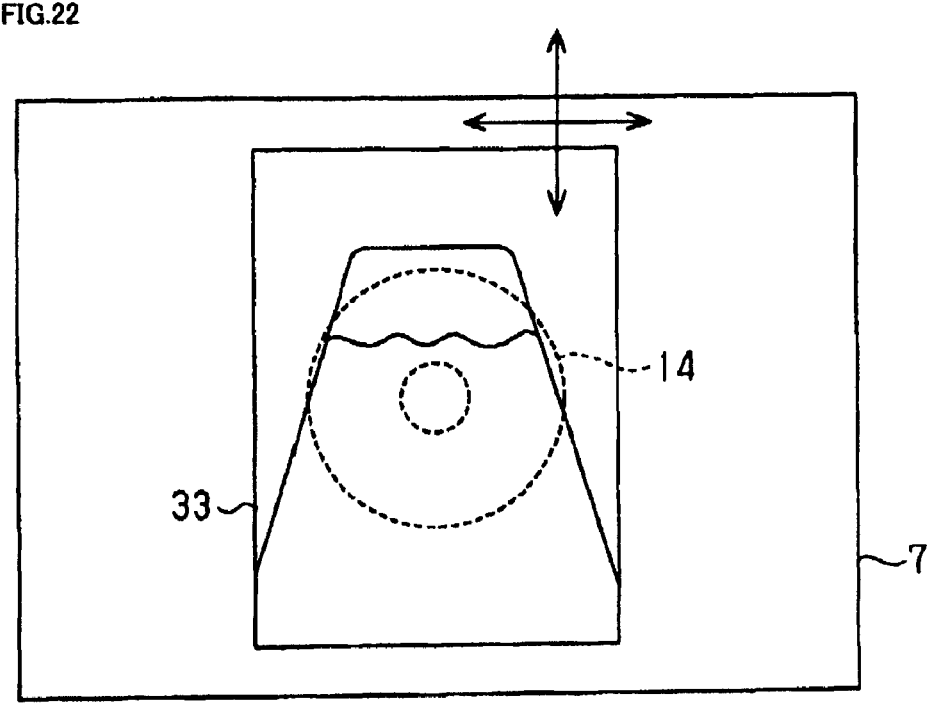
FIG. 22 is a view of LCD screen when card printing takes place.

Next, CD-R printing through card reading in a stand-alone device is described. A user inserts the memory card 12 into the card slot 13, and, from the images in the memory card 12, he/she selects an image (an image in the sample medium) that he/she wants to print. Then, using the various switches 8, as shown in FIG. 22, a print image 33 and layout information R thereof are set by moving the print image 33 in the longitudinal and cross directions with respect to the print reference position (CD-R 14) or changing the print size by resizing. Then, diameter size of the CD-R 14 to be printed is also set. In addition, the layout information R is coordinate values that indicate position information when the print image 33 is laid out in the print range of the CD-R 14.

After setting these conditions, the print mode is set to a CD-R print mode by operating Select button 10, and a printing method in the mode to card printing, i.e., the method for printing on the CD-R 14 on the basis of the image data read from the memory card 12 is set. When Print Start button 11 is pressed after setting various print conditions, the CPU 16 executes CD-R printing to be discussed below on the basis of the medium print execution program in the ROM 18.

First, the CPU 16 reads the layout information R set by the user and determines a position of the print image 33 on CD-R 14 and print size. Then, the CPU 16 reads the print image 33 from the memory card 12. The CPU 16 expands the read image data to the position and the print size on the basis of the layout information R, and creates the pixel data (RGB data) 34 that ranges a minimum square in which CD-R 14 is fit as shown in FIG. 23. The pixel data 34 contains the center hole part 31 and the outside part 32 of the CD-R image that are not necessary for printing, and has no shadow part 27.

In addition, the ROM 18 stores the table TB2 for card printing as shown in FIG. 24. The mask information K of the table TB2 stores Kc and Kd in accordance with the diameter size Sa (12 cm) and Sb (8 cm) of the CD-R 14, and specifies pixels in the center hole part 31 of the pixel data 34 and those in the outside part 32 of the CD-R image 28 as shown in FIG. 23. Then, when size of the CD-R14 is set to Sa, the CPU 16 executes masking on the basis of the mask information Kc in a method similar to scan printing, and sets, as a white data (data for which no ink is discharged), any part of the pixel data 34 that is not necessary for printing.

Then, the CPU 16 transmits the pixel data 34 after masking to the ASIC 20. The ASIC 20 executes resolution conversion, binarization, and microweaving on the pixel data 34 inputted by card reading, and sequentially creates a head drive data for one scan. Then, as soon as the head drive data for one scan has accumulated in RAM 24, the ASIC 20 sequentially outputs it to the printer unit 22 and makes the printer unit 22 to execute CD-R printing.

In addition, when printing to print a plurality of images on one CD-R 14 by card printing is set, the CPU 16 processes the combination information as the layout information R and prints the plurality of images on the CD-R on the basis of the layout information R. For example, as shown in FIG. 25, when a total of 4 images comprised of 2 images each arranged vertically and horizontally are to be printed on the CD-R 14, a minimum square range containing the CD-R image 28 (the print face of the CD-R 14) is set as a print layout face L0, the print layout face L0 being divided into 4 first to fourth layout frames L1 to L4 of upper left, upper right, lower left and lower right. Then, for respective images to be laid out in the first to fourth layout frames L1 to L4, a coordinate value C1 in the first layout frame L1, a coordinate value C2 in the second layout frame L2, a coordinate value C3 in the third layout frame L3, and a coordinate value C4 in the fourth layout frame L4 are set as the layout information R. The CPU 16 expands the image data read from the memory card 12 in the first to fourth layout frames L1 to L4, and creates a head drive data necessary for CD-R printing by executing the image editing processing, image processing, and so on. With this, the 4 images are printed on the CD-R 14.

Figure 26:
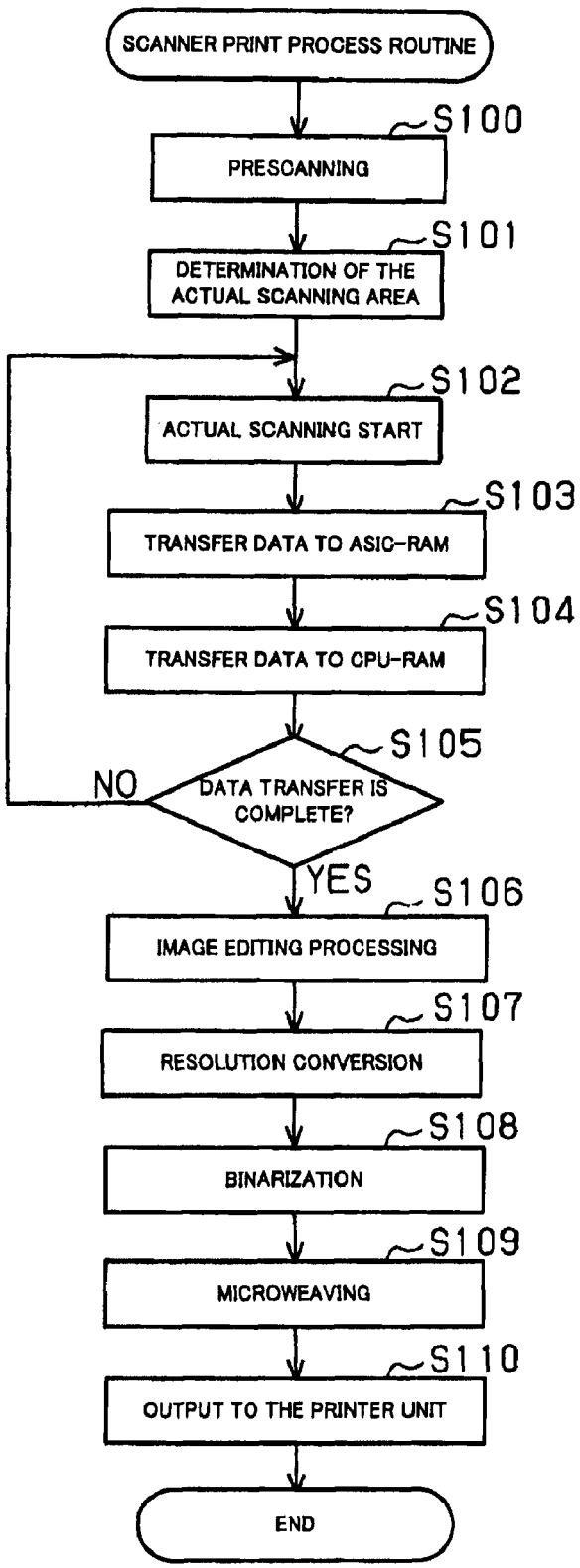
FIG. 26 is a flow chart showing the flow when CD-R printing takes place by scanning.

Now the procedure when the CPU 16 executes the CD-R printing by scanning is described with reference to the flow chart of FIG. 26.

In Step 100, prescanning takes place. With this it is determined in what position of the document bed the sample CD-R is placed.

In Step 101, the actual scan area is determined. More specifically, although the shadow part 27 of the sample CD-R is scanned as an image at the time of scanning, the minimum square area in which the CD-R image 28 containing the shadow part 27 is fit (the area shown by the dotted line in FIG. 18) is determined as an actual scan area.

In Step 102, the actual scan starts. That is, an operation command is outputted to the scanner unit 21, thereby starting scanning of the actual scan area in the sample CD-R placed on the document bed 3.

In Step 103, the image data is transferred to the RAM 24 of the ASIC 20.

In Step 104, the image data is transferred to the RAM 19 of the CPU 16.

In Step 105, it is determined whether data transfer has completed or not. Then, if the data transfer has completed, the pixel data (RGB data) 30 as shown in FIG. 19 that corresponds to size of the sample CD-R25 is created. Now when the data transfer has completed, the process proceeds to S106, while it returns to S102 to continue data transfer if the data transfer has not completed.

In Step 106, the image editing process is executed on the pixel data 30 written into the RAM 19 of the CPU 16. Now, the center point 30b of the pixel data 30 is determined by matching, on the basis of which masking any part of the pixel data 30 not necessary for printing is carried out.

In Step 107, the ASIC 20 is made to execute conversion of resolution. More specifically, resolution of the pixel data 30 is converted into resolution corresponding to the print resolution of the printer unit 22.

In Step 108, the ASIC 20 is made to carry out binarization, and conversion of the pixel data 30 of the RGB system into the YMCK data.

In Step 109, the ASIC 20 is made to execute microweaving.

In Step 110, the pixel data 30 after microweaving is outputted to the printer unit 2, to execute CD-R printing.

Figure 27:
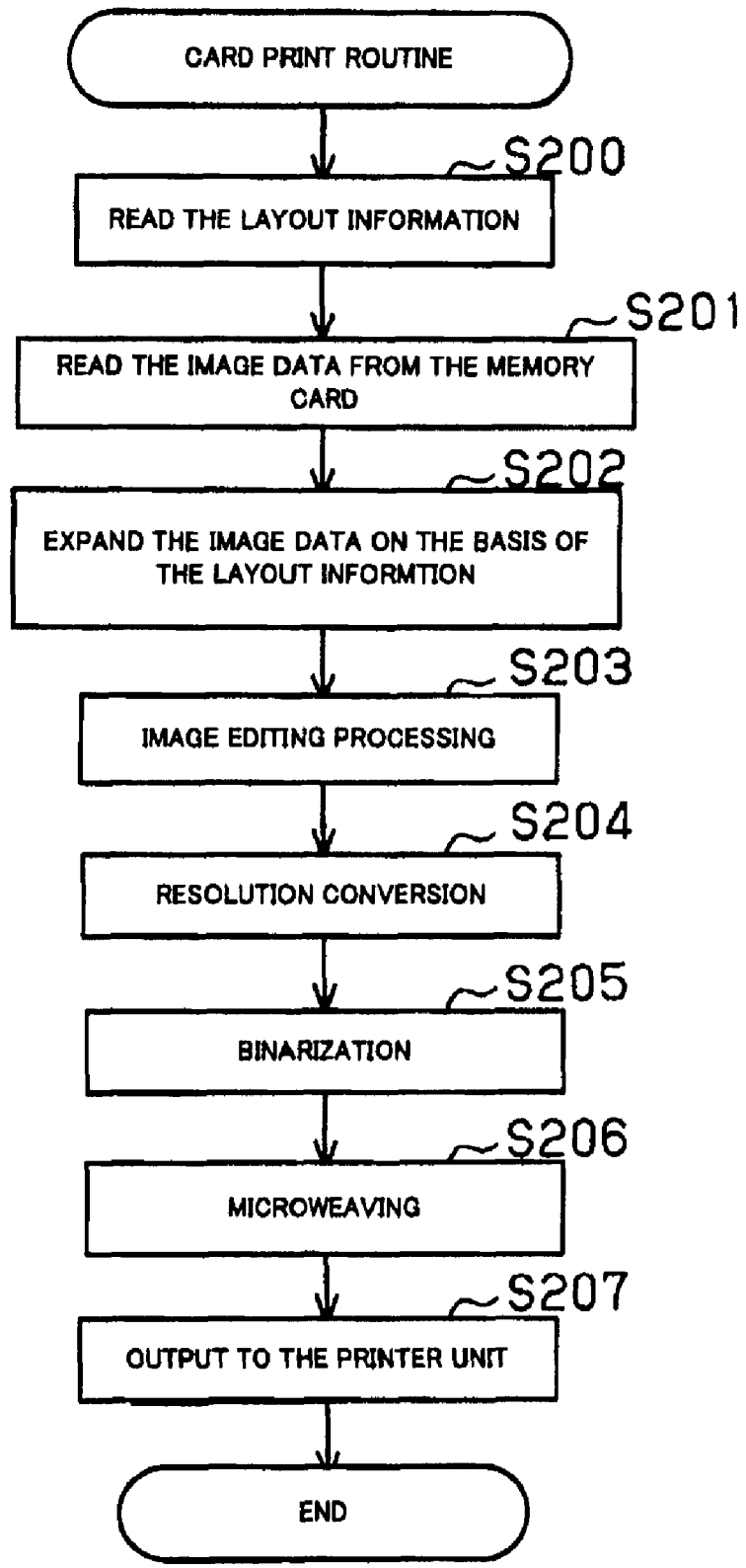
FIG. 27 is a flow chart showing the flow when CD-R printing takes place by card reading.

Next, with reference to the flow chart in FIG. 27, the procedure when the CPU 16 executes CD-R printing by card reading is described.

In Step 200, the layout information R set by the user is read.

In Step 201, the image data is read from the memory card 12. More specifically, the image data of the image specified by the user is read from the memory card 12.

In Step 202, the image data is expanded on the basis of the layout information R. More specifically, the read image data is expanded in the position and the print size on the basis of the layout information R (specifically, coordinate values), and the pixel data (RGB data) 34 that ranges the minimum square in which the CD-R 14 is fit is created.

In Step 203 to Step 207, similar processes to Step 106 to Step 110 described above are executed.

In addition, when a plurality of images (4 images in this example) is printed on one CD-R 14 (see FIG. 25) by card reading, on the basis of the layout information R read in Step 200, the image data at the positions of the first to fourth layout frames L1 to L4, respectively, is read from the memory card 12 (Step 201). Then, the read respective image data is expanded into the respective layout frames L1 to L4 at positions (coordinate values C1 to C4) and the print size on the basis of the layout information R, and the pixel data (RGB data) is created on the print layout face L0 that ranges the minimum square in which the CD-R 14 is fit (Step 202). Then, masking any part in the respective layout frames L1 to L4, which are not necessary for printing, (the center hole part 31 and the outside part 32 shaded in FIG. 25) takes place (Step 203). In the following, the conversion of resolution, binarization, and microweaving in the same manner are executed (Steps 204 to 206), and the pixel data after the microweaving (binary data of YMCK) is outputted to the printer unit 22 (Step 207) to execute CD-R printing.

As described above, according to the example, although the shadow part 27 is formed on the image data of the scanned sample CD-R 25 due to thickness of the sample CD-R25, pixels in the shadow part 27 are masked as white data for which no ink is discharged. In addition to this, pixels corresponding to the hole part 31 and the outside part 32 of the CD-R14 that are not necessary for printing are also masked. Thus, even though CR-R printing takes place by scan printing, the parts that need not be printed such as the shadow part 27, the hole part 31 and the outside part 32 are not printed and outputted to the CD-R14, while only the image to appear is printed on the CD-R 14.

In addition, since only data from the image data read from the memory card 12 necessary for CD-R printing is clipped for expansion, image is edited and printed on the CD-R 14, no ink is discharged for the part not necessary for printing, and similar to scan printing, only the image to appear can be printed on the CD-R 14. This enables scanned images or images read from the memory card 12 to be printed and outputted onto the CD-R 14 in good condition.

With the above embodiment, the following effects can be achieved:

(1) The configuration is made such that any image data 26 taken in by scanning or card reading undergoes image editing, pixels not necessary for printing are masked, and CD-R printing takes placed on the basis of the data. Therefore, a stand-alone device using scanner printing or card printing can execute CD-R printing.

(2) The configuration is made such that tables TB1 and TB2 in which mask information K is written for every size of a CD-R 14 (2 types in this example) are prepared, and masking is performed on the basis of these tables TB1 and TB2. Thus, images of a sample CD-R 25 taken in by scanning or images read from the memory card 12 can be printed on a CD-R 14 of different sizes.

(3) In case of the card printing, longitudinal and cross positions or print size of print images that have been set on the operation panel part 6 are reflected in CD-R printing. Thus, a user can execute CD-R printing with desirable print positions or print sizes.

(4) In the case of card printing, since a plurality of images can be recognized as one print image, the print image that is a combination of a plurality of images can be printed on the CD-R 14.

(5) As the printer 1 is provided with both a scanner function and a card reading function, it can execute both scanner printing and card read printing by itself.

The above embodiment may be modified as described below:

(Variant 1)

Applicable CD-14 size is not limited to 2 types, and 1 type or more than 2 types may be accepted.

(Variant 2)

A sample medium is not limited to a CD-R and may be any other medium such as DVD-R, etc. In addition, a sample medium is not limited to such a medium as CD-R, and the like, into which digital signals are written, and it may be something else having such an extent of the thickness that will have a shadow at the time of scanning.

(Variant 3)

A CD-R tray 15 is not limited to a component that is distinct from the printer 1, but, for example, a component incorporated in the printer 1 may be adopted.

(Variant 4)

The printer 1 does not need to have both a scanner function and a card reading function, and it may be of the configuration with either one of them.

(Variant 5)

In CD-R printing by card reading, an image expansion size on the basis of the layout information R may be in a predetermined data size unit. That is, the RAM 19 provided in the printer 1 may not have sufficient capacity to store the image data (RGB data) after expansion that corresponds to pixels in the range of printing. In this case, sequential expansion of the image data by predetermined data size unit according to the capacity of the RAM 19 enables printing even though the capacity of the RAM 19 is small. This could minimize possible increase in product cost due to mounting of a RAM 19 of a large memory size to the printer 1.

Sixth Embodiment

Figure 28:
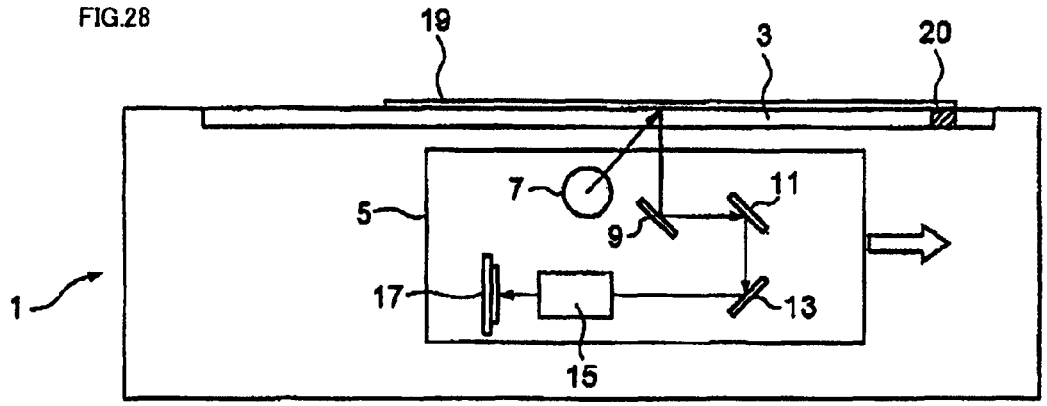
FIG. 28 is an illustration showing configuration of an image scanner according to one embodiment of the present invention.

FIG. 28 is an illustration showing the configuration of the image scanner according to one embodiment of the invention.

The image scanner described above has a main body of the equipment 1, a document bed glass 3 placed on a top face of the main body of the equipment 1, and an optical head 5 that is provided inside the main body of the device 1 and movable horizontally. In the optical head 5, a light source 7, mirrors 9, 11, 13, an imaging lens 15, and an one-dimensional image sensor 17 are respectively provided at predetermined positions. Then, a copy CD (original disk) 19, for example, is placed on the document bed glass 3.

In the above configuration, when the copy CD 19 is illuminated by light to be emitted from the light source 7, reflecting light from the copy CD 19 is turned back on the path by the mirrors 9, 11, 13, and is incident into the one-dimensional image sensor 17 through the imaging lens 15. With this, the image of the copy CD 19 is formed on the one-dimensional image sensor 17. The image of the copy CD 19 to be read by the one-dimensional image sensor 17 is one-dimensional. Thus, a two-dimensional image can be obtained by moving a read position (scan position) by the one-dimensional image sensor 17 in the orthogonal direction to the array direction of pixels of the one-dimensional image sensor 17. Movement of the read position to the orthogonal direction by the one-dimensional image sensor 17 can be achieved by moving the optical head 5 in the cross direction of FIG. 28. In FIG. 28, in a region 20 close to the right end of the document bed glass 3 is formed a 1-mm wide belt-like shadow corresponding to the thickness of the copy CD 19 (1 mm).

Figure 29:
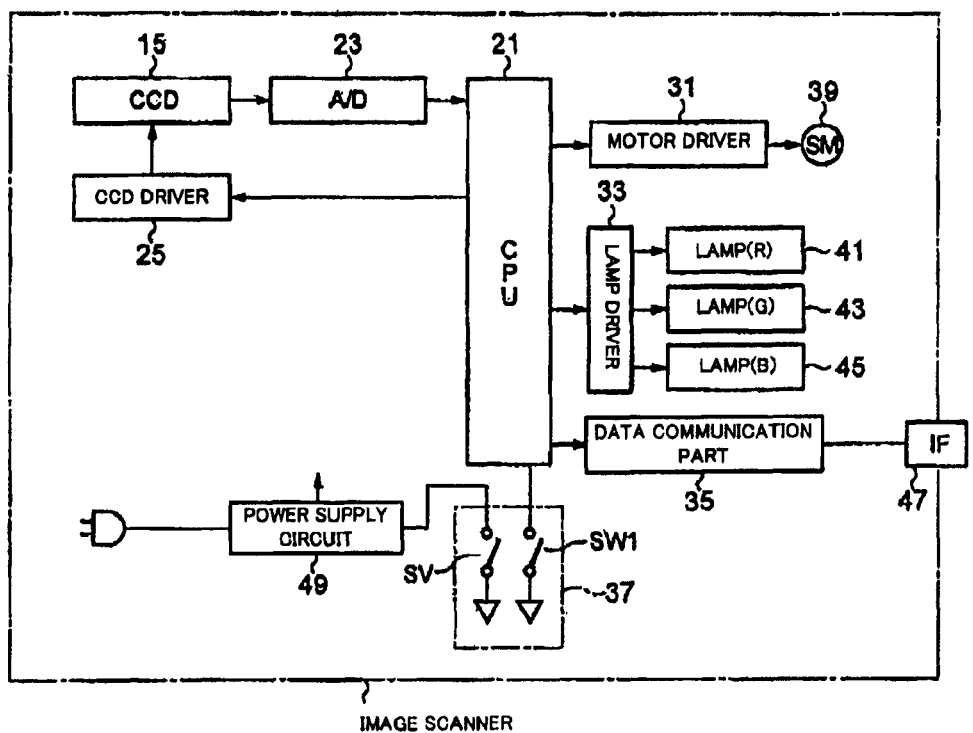
Figure 30A:
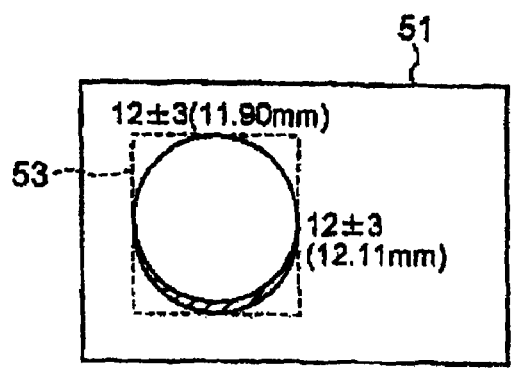
FIGS. 30A through 30E are illustrations showing the process of image processing to be executed by the image scanner according to one embodiment of the present invention.
Figure 30B:
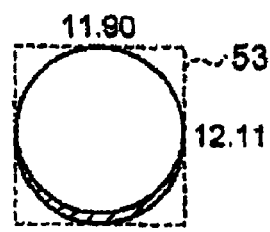
Figure 30C:
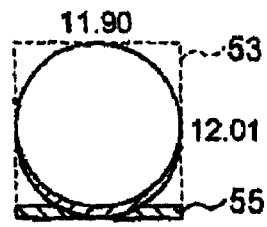
Figure 30D:
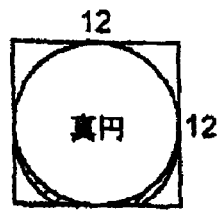
Figure 30E:
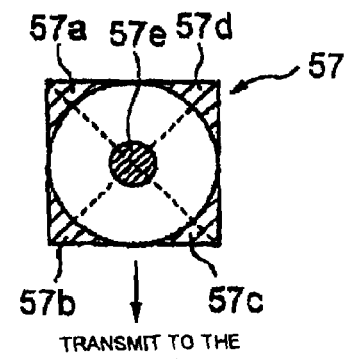

FIG. 29 is a block diagram showing the configuration of a control system that the image scanner as shown in FIG. 28 is provided with.

As shown in FIG. 29, the control system comprises a CPU 21, an A/D converter (hereinafter described as "ADC") 23, and a CCD drive circuit 25 (hereinafter referred to as a "CCD driver") 33. In addition to the above components, the control system further comprises a motor drive circuit (hereinafter described as a "motor driver") 31, a lamp drive circuit (hereinafter referred to as a "lamp driver"), a data communication part 35, and an operating part 37.

Under the control of the CPU 21, the CCD driver 25 drives the line CCD (i.e., the one-dimensional image sensor as shown in FIG. 28) (same in the following). Driven by the CCD driver 25, the line CCD 17 reads an image of a copy CD 19 to be given to the CCD 17 through the mirrors 9, 11, 13 and the imaging lens 15, converts the image into an analog electric signal, and outputs it to the ADC 23. The ADC 23 converts the analog signal into a digital signal and outputs it to CPU 21.

Under the control of the CPU 21, the motor driver 31 drives a stepping motor (hereinafter referred to as "SM") 39 to transmit torque to a power transmission mechanism (now shown) for moving the optical head 5 described above in the cross (horizontal) direction of FIG. 28. Driven by the motor driver 31, the SM 39 moves the optical head 5 back and forth in the cross direction (horizontal direction) of FIG. 28 through the power transmission mechanism (not shown).

Under the control of the CPU 21, the lamp driver 33 drives the light source 7 as shown in FIG. 28, that is, a red lamp 41, a green lamp 43, and a blue lamp 45. Driven by the lamp driver 33, the red lamp 41, the green lamp 43, and the blue lamp 45 emits red light, green light and blue light, respectively, on a copy CD 19 placed on the document bed 3 as shown in FIG. 28.

The data communication unit 35 is used when the CPU 21 sends and receives data with, for example, the printer (not shown) through an interface (hereinafter described as "IF") 47. For example, an SCSI interface may be used as the data communication unit 35. Reset switch SW1 and Power switch SV both of which always have open contacts are provided in the operating part 37. The Reset switch SW1 resets the CPU 21 by closing the contact. By closing the contact, the Power switch SV cuts off drive power supply to respective parts of the control system including the CPU 21, through a power supply circuit 49 from AC power supply (commercial power supply).

The CPU 21 totally controls operations of the above respective components that are under the control thereof. Controlling the SM 39 through the motor driver 31, the CPU 21 moves the optical head 5 back and forth in the cross direction (horizontal direction) within the main body of the equipment 1 as shown in FIG. 28. With this, illuminated by the light source 7, the CPU 21 inputs a result of reading with the ADC 23 by the line CCD 17 of the light that hits on a copy such as the copy CD 19 (for example, as placed on the document bed glass 3) and is reflected through the document copy glass 3. Then, on the basis of the result of reading, it determines whether the copy on the document bed glass 3 is a CD or not.

In one embodiment of the present invention, 6 processes as described below are executed as processes for removing a shadow area from a copy CD image read by the image scanner and correcting distortion.

First, a process to prescan a copy CD (original disk) at a low resolution (hereinafter described as "a first process") takes place, followed by a process to distinguish a copy area from an area of the image acquired by prescanning (hereinafter described as a "prescan image") (hereinafter described as "a second process"). Then, a process to the actual scanning of the distinguished copy area at a high resolution requested by a user (hereinafter described as a "third process") is executed, followed by a process to remove a shadow area from areas (images) read by actual scanning (hereinafter referred to as a "fourth process"). Then, a process to vertically/horizontally resize the area by resizing takes place, so that dimensions of an area from which the shadow area was removed (remaining area) in the longitudinal and cross directions can be predetermined values (hereinafter described as a "fifth process"), and lastly for the image that has undergone the fifth process, any area not to be printed is masked (hereinafter described as a "sixth process").

FIG. 30 is an illustration showing the stage of image processing to be executed in the image scanner according to one embodiment of the present invention.

Among the above 6 processes, FIG. 30 shows the second process to the sixth process. In FIG. 30 (*a*) showing the above second process, a rectangular area 51 represents an area read into the image scanner by prescanning, inside which a square-shaped area 53 is an area of a copy image (copy CD) determined on the basis of intensity (brightness). That is, in the area 51, when a value of intensity of one area exceeds or reaches a reference value of intensity for determining a copy image, it is determined that the area is a part of the copy image. For the copy image, as a CD whose diameter is 12 cm is assumed, for example, the area, i.e., the copy image is an image of the copy CD if dimension of the area 53 falls within 12 cm±3% (±3% is an error). In this embodiment, if vertical dimension of the area 53 is 12.11 mm, for example, and horizontal dimension is 11.90 cm, for example, it is determined that the image of the area 53 is that of the copy CD. In addition, the image of the copy CD as shown in the area 53 is distorted (in the longitudinal and cross directions) when compared with the actual copy CD.

Then, in FIG. 30 (*b*) showing the third process, the area 53 is read by actual scanning. In the actual scanning, the area 53, i.e., the copy image area recognized by prescanning, is read at a high resolution requested by the user. Then, in FIG. 30 (*c*) showing the fourth process, a shadow area that is expected to be formed (side on which a shadow appears), i.e., a shadow area of predetermined shadow width (e.g., 1 mm) is removed from the image read by the third process (i.e., the area 53). In FIG. 30 (*c*), the belt-like area designated by a symbol 55 is a 1-mm wide shadow area. As discussed earlier, the shadow area 55 corresponds to the region 20 close to the right end of the document bed glass 3 as shown in FIG. 28. Then, in FIG. 30 (*d*) showing the fifth process, vertical/horizontal size is changed (resized) so that the remaining area after the shadow area 55 is removed from the area 53 will be 12 cm×12 cm, for example. This enables the contour of the copy CD image that is almost an elliptical shape to be corrected to an approximately complete round shape, thereby correcting distortion of the image (in the longitudinal and cross directions) in the area 53.

Lastly, in FIG. 30 (*e*) showing the sixth process, 4 sides of the square of 12 cm×12 cm designated with symbol 57, 4 areas 57*a*, 57*b*, 57*c* and 57*d* defined by the circle and being concentric with the center of the square having the diameter of 12 cm, and a disk hole of the center as shown by symbol 57*e* are masked. This is because the respective areas 57*a* to 57*e* are areas where no printing takes place, and masking of these areas can prevent the printer from jetting ink.

The image of the copy CD after the sixth process was executed, that is, the image after the areas 57*a* to 57*e* were removed from the area 57 by masking is transmitted from the image scanner to the printer (not shown) as an image of the copy CD.

Figure 31:
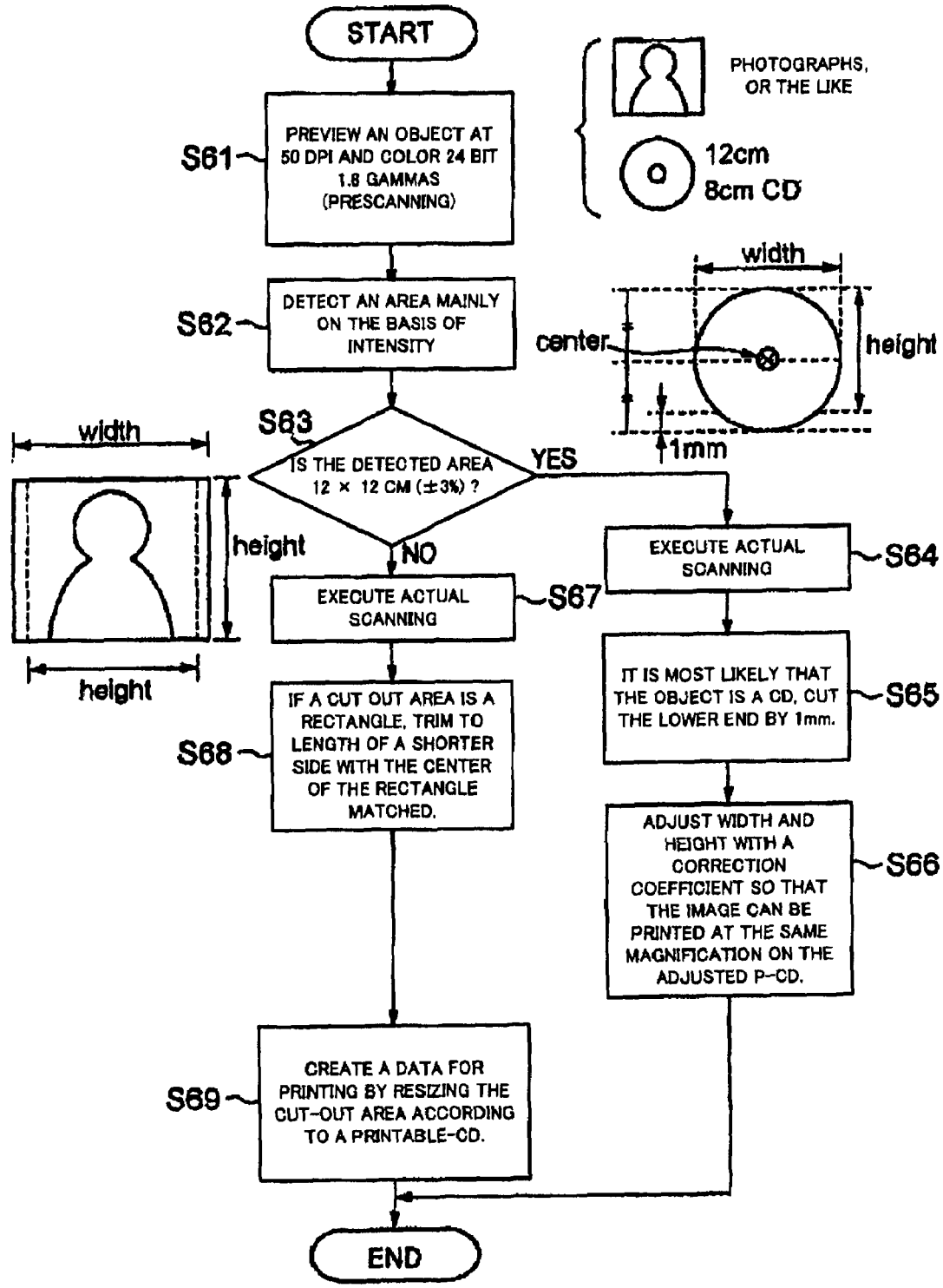
FIG. 31 is a flow chart showing a procedure of image processing on a copy image read by the image scanner of FIG. 28, the procedure being performed by CPU shown of FIG. 29.

FIG. 31 is a flow chart showing the procedure of image processing by the CPU 21 as shown in FIG. 29, on the copy image read by the image scanner as shown in FIG. 28.

In FIG. 31, first, the copy image to be read is prescanned at 50 dpi, color 24 bit 1.8 gammas (i.e., at a low resolution), and a prescanned image is acquired. The copy image includes a copy image such as a magazine or a photograph, a CD whose diameter is 12 cm, or a CD whose diameter is 8 cm (Step S61). Next, a process to distinguish the copy area from the area in the prescanned image (hereinafter described as a "second process") is executed. In other words, on the basis of a value of intensity of the read prescanned image, an actual copy area contained in the prescanned image is identified. As described above, when a value of intensity of a certain area exceeds or reaches a predetermined value of reference intensity (for determining that it is a copy image), it is determined that it is a copy image area (Step S62).

Then, it is checked whether the vertical/horizontal size of the copy image area identified as described above is (12 cm±3%)×(12 cm±3%) (Step S63). As a result of this, when the copy image area is (12 cm±3%)×(12 cm±3%) (YES in Step S63), actual scanning is executed on the copy image area at a high resolution requested by the user. Then, from the image read by the actual scanning, that is, the copy image area of (12 cm±3%)×(12 cm±3%), an area under it and having width of 1 mm, for example, is removed. As it is likely that the copy image is the CD image, a process to remove a belt-like 1-mm wide area on the lower end of the copy image as a shadow area is executed (Step S65).

Then, changing (resizing) the vertical/horizontal size of the remaining area after the belt-like 1-mm wide area was removed is executed so that the area will be 12 cm×12 cm. This enables printing of the copy image at the same magnification on a label face of a print object CD, for example. Furthermore, after masking on areas of the copy image that are not to be printed, the copy image after the masking is transmitted from the image scanner to the printer (not shown). Then, a series of image processing operations of the CPU 21 on copy images read by the image scanner is completed (Step S66).

In the checking of the vertical/horizontal size of the copy image area, when the copy image area is not (12 cm±3%)×(12 cm±3%) (NO in Step S63), actual scanning of the copy image area is executed at a high resolution as requested by the user (Step S67). Then, when the contour of the copy image area read by this actual scanning is rectangular (oblong shaped), the center point of the copy image area is first determined. Then, a process to cut out a circular area having the radius of 12 cm, for example, around the center point from the copy image area is executed (Step S68). Then, the cut out area is printed at the same magnification on a label face of a print object CD, for example. Furthermore, after masking on the area of the copy image that is not to be printed, the copy image after the masking is transmitted from the image scanner to the printer (not shown), and a series of image processing operations of the CPU 21 on the copy image read by the image scanner is completed (Step S69).

In addition, should the copy image be recognized as a copy image of CD (12 cm×12 cm) and dimension of the copy image be adjusted although the copy image is a copy image such as a photograph or magazine, and not a copy image such as CD (12 cm×12 cm), there will arise no problem because the copy image itself is free from distortion.

As described above, according to one embodiment of the present invention, creation of a copy image that enables an (copy) image read from a copy disk to be printed on a different disk accurately and neatly so that there will be no shadow or margin becomes possible.

The invention claimed is:

1. An image processing system, comprising:
   an image acquisition unit for acquiring a scanned image;
   a non-volatile storage medium that stores correction information prior to the acquiring of the scanned image, said correction information corresponding to a known object having a planar shape specified by a standard; and
   when an object of the scanned image is the known object, a correction unit that corrects distortion of an aspect ratio of the scanned image on the basis of the correction information and that resizes the scanned image with different factors in longitudinal and cross directions.

2. An image processing system according to claim 1, wherein the known object is a disk type storage medium,
   the correction unit corrects distortion of the scanned image by deforming the scanned image so that a rectangle circumscribing an area to be divided by area division will have an aspect ratio to be determined by the correction information.

3. The image processing system according to claim 1, wherein the correction unit corrects distortion of the scanned image by resizing the scanned image to a standard size specified by the correction information.

4. The image processing system according to claim 1, wherein the correction unit corrects distortion of the entire scanned image.

5. The image processing system according to claim 1, wherein
   the image acquisition unit reads an entire readable area at a low resolution, and reads a portion of the entire readable area at a higher resolution than the low resolution to obtain the scanned image; and
   the correction unit determines whether an object of the scanned image is the known object and causes the scanning unit to read the portion of the entire readable area at the higher resolution when the object is the known object.

6. An image processing method, comprising:
   acquiring a scanned image;
   acquiring correction information from a non-volatile storage medium that stores the correction information prior to the acquiring of the scanned image, said correction information corresponding to a known object having a planar shape specified by a standard; and
   when an object of the scanned image is the known object, correcting distortion of an aspect ratio of the scanned image on the basis of the correction information and resizing the scanned image with different factors in longitudinal and cross directions.

7. The image processing method according to claim 6, wherein the correcting distortion of the scanned image comprises resizing the scanned image to a standard size specified by the correction information.

8. The image processing method according to claim 6, wherein the correcting distortion of the aspect ratio of the scanned image comprises correcting distortion of the entire scanned image.

9. The image processing method according to claim 6, wherein the acquiring the scanned image includes reading an entire readable area at a low resolution and reading a portion of the entire readable area at a higher resolution than the low resolution;
   wherein the portion of the entire readable area is read at the higher resolution when the object is the known object.

* * * * *